United States Patent [19]

Shikama et al.

[11] Patent Number: 5,142,387
[45] Date of Patent: Aug. 25, 1992

[54] PROJECTION-TYPE DISPLAY DEVICE HAVING LIGHT SOURCE MEANS INCLUDING A FIRST AND SECOND CONCAVE MIRRORS

[75] Inventors: Shinsuke Shikama; Masahiro Usui; Eiichi Toide; Hiroshi Kida; Mitsushige Kondo, all of Nagaokakyo, all of Japan

[73] Assignee: Mitsubishi Denki Kabushiki Kaisha, Tokyo, Japan

[21] Appl. No.: 682,626

[22] Filed: Apr. 9, 1991

[30] Foreign Application Priority Data

| Apr. 11, 1990 | [JP] | Japan | 2-96734 |
| Apr. 11, 1990 | [JP] | Japan | 2-96735 |
| Apr. 23, 1990 | [JP] | Japan | 2-107928 |

[51] Int. Cl.$^5$ ............ G02F 1/13; F21V 7/00
[52] U.S. Cl. .................. 359/49; 359/41; 353/122; 362/298
[58] Field of Search ........... 350/338, 345, 334, 620, 350/630; 362/298, 302, 303; 359/49, 40, 41, 70; 353/122; 358/60, 61

[56] References Cited

U.S. PATENT DOCUMENTS

| 2,198,014 | 7/1937 | Ott | 362/303 |
| 3,796,886 | 3/1974 | Freeman | 362/303 |
| 4,151,584 | 4/1979 | Labrum | 362/302 |
| 4,171,874 | 10/1979 | Bigelow et al. | 350/345 |
| 4,721,366 | 1/1988 | Nosker | 350/345 |
| 4,735,495 | 4/1988 | Henkes | 350/345 |
| 4,765,718 | 8/1988 | Henkes | 350/345 |
| 4,871,249 | 10/1989 | Watson | 350/630 X |

FOREIGN PATENT DOCUMENTS

| 64-49017 | 2/1989 | Japan . |
| 2-1818 | 2/1990 | Japan . |
| 2157049 | 10/1985 | United Kingdom | 350/345 |

Primary Examiner—Stanley D. Miller
Assistant Examiner—Huy K. Mai

[57] ABSTRACT

The projection-type display device has a light source emitting a parallel luminous flux, a liquid crystal light valve disposed on the luminous flux and outputs a rectangular two-dimensional image to be projected on a screen, and a projection lens magnifying the rectangular two-dimensional image output. The light source has a first concave mirror (parabolic mirror) the reflective surface of which is oriented in the direction of emission of the luminous flux, a lamp laced in front of the first concave mirror, and a second concave mirror (parabolic mirror or spherical mirror), the reflective surface of which is oriented toward the first concave mirror. In the second concave mirror is formed an aperture window, which is a rectangle of substantially similar to that of the liquid crystal light valve and emits a rectangular luminous flux. The beam from the lamp is reflected by the first concave mirror, and one or more times by the second concave mirror, becoming a parallel beam oriented in the direction of the optical axis. The parallel light beam is made into a luminous flux of rectangular cross section by the rectangular aperture window. Accordingly, luminous flux is not blocked wastefully, but serves to increase the brightness of the projected image.

57 Claims, 20 Drawing Sheets

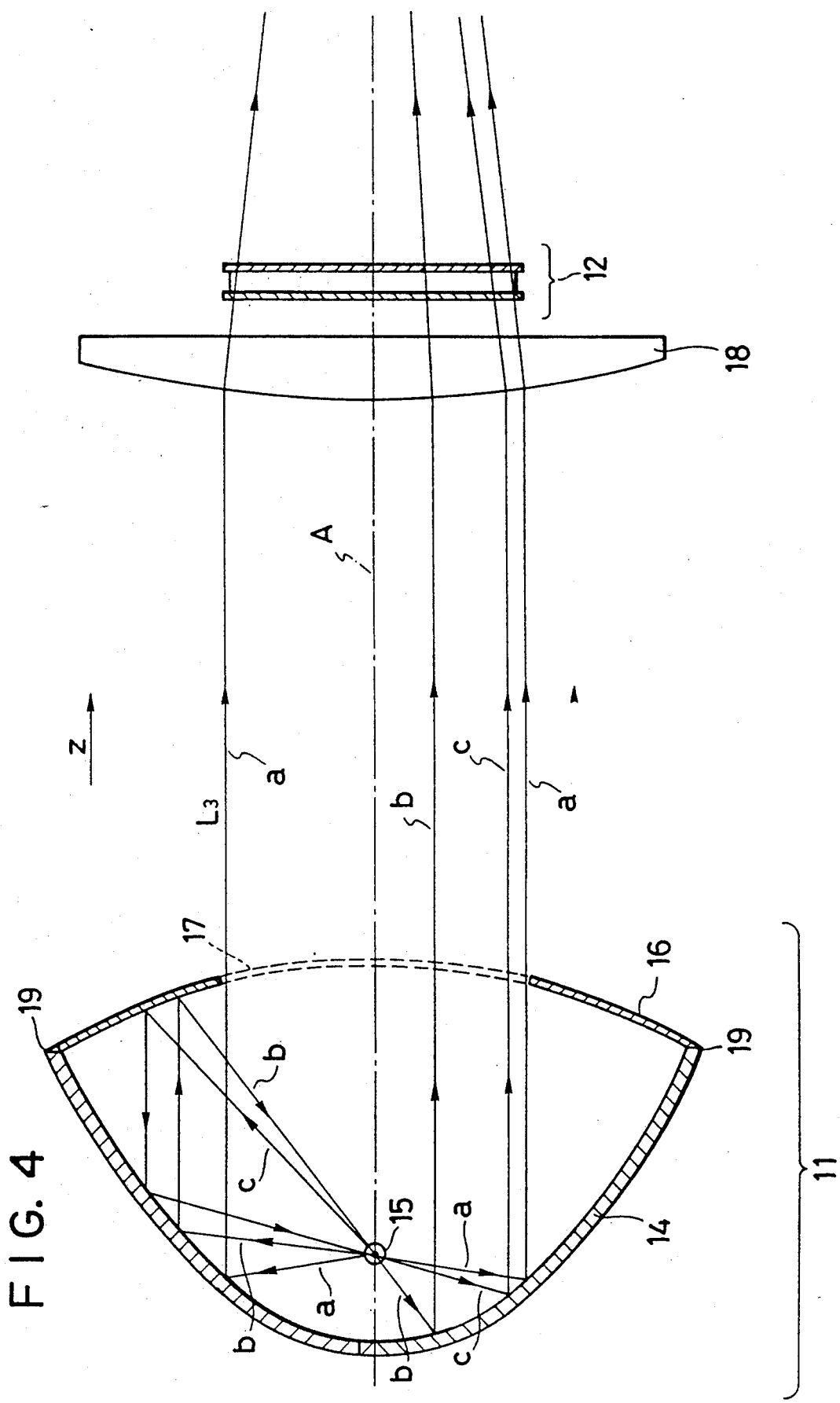

$f_6 > X_6$ $f_6 = X_6$ $f_6 < X_6$

PROJECTION-TYPE DISPLAY DEVICE HAVING LIGHT SOURCE MEANS INCLUDING A FIRST AND SECOND CONCAVE MIRRORS

BACKGROUND OF THE INVENTION

This invention relates to a projection-type display device for magnifying an image formed on a liquid crystal light valve and projecting it on a screen.

The conventional projection-type display device shown in FIG. 1 is comprised mainly of: a light source 1 that emits a parallel luminous flux $L_1$ in one direction; a liquid crystal light valve 2 that changes the distribution of a luminous flux $L_2$ which passes through and changes the contrast of a rectangular image; and a projection lens 3 which magnifies luminous flux $L_2$ and projects on screen S a rectangular image (for example, under the NTSC standard a rectangle in which the proportion of the long side to the short is 4:3). Here, light source 1 comprises a parabolic mirror 4 and a lamp 5 (for example a metal halide lamp or xenon lamp), the center of luminescence of which is at the focal point of parabolic mirror 4. The reference numeral 6 designates a condenser lens.

However, because the luminous flux $L_1$ emitted by the projection-type display device described above is of circular cross section, that portion of the luminous flux impinging on the periphery of the rectangular display area of liquid crystal light valve 2 made no contribution to projecting the image. FIG. 2 is for the purpose of clarifying this point, and shows that the hatched portion within the circular cross section of luminous flux $L_1$ is the portion that makes no contribution to projecting the image.

It can thus be seen that with conventional projection-type display devices, a portion of the luminous flux emitted from light source 1 is wasted, and this fact inhibits efforts to increase the brightness of the projected image.

Also, the direct divergent beam from the lamp 5 ((d) of FIG. 2) is not used to make the image on the screen, because obscured by the liquid crystal light valve 2.

SUMMARY OF THE INVENTION

An object of the present invention is to provide a projection-type display device capable of increasing the brightness of the projected image by decreasing the proportion of the luminous flux radiated toward the liquid crystal light valve that is blocked by portions other than the display area of the light valve and therefore wasted.

The projection-type display device of the present invention has: a light source that emits a parallel luminous flux in one direction; a liquid crystal light valve which is placed on the luminous flux from this light source and which outputs a two-dimensional rectangular image for projection on a screen; and a projection lens that magnifies and projects the two-dimensional image output from the liquid crystal light valve. In addition, the light source has: a lamp and a first concave mirror the reflecting surface of which is oriented toward this lamp and the liquid crystal light valve; and a second concave mirror the reflecting surface of which is oriented toward this lamp and the first concave mirror. Further, the second concave mirror has a rectangular aperture window. The aperture window is of a rectangular configuration substantially similar to that of the liquid crystal light valve, and emits a rectangular luminous flux in the direction of the liquid crystal light valve.

Accordingly the luminous flux that was wasted in the conventional projection-type display device that did not have a second concave mirror having an aperture window can, by means of the second concave mirror, be reflected toward the first concave mirror. This means that the luminous flux that was conventionally wasted is reflected between the first concave mirror and the second concave mirror, and is then emitted from the aperture window, impinges on the rectangular display area of the liquid crystal light valve, and is used effectively in projecting the image.

BRIEF DESCRIPTION OF THE DRAWINGS

FIG. 4 shows the path of the luminous flux in the embodiment in FIG. 3.

DETAILED DESCRIPTION OF THE EMBODIMENTS

A preferred embodiment of the present invention will be described with reference to FIGS. 3, 4, 5A and 5B.

Figure 3:
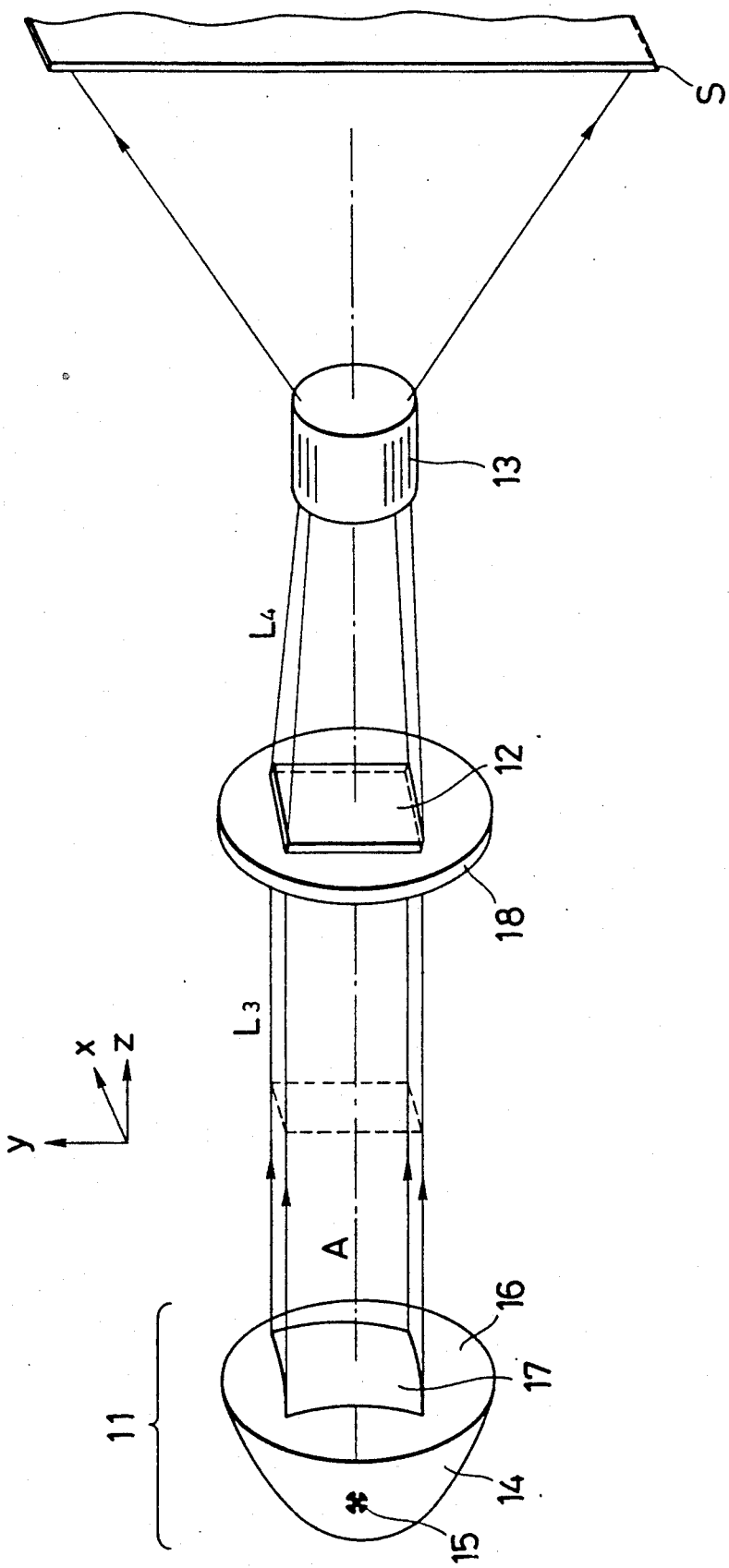
FIG. 3 shows the structure of an embodiment of the present invention.

The projection-type display device of this embodiment, as can be seen in FIG. 3, is comprised mainly of: a light source 11 that emits a parallel luminous flux $L_3$ directed in a single direction (the z direction); a liquid crystal light valve 12 that changes the contrast of a rectangular image display area and changes the distribution of luminous flux $L_4$, which passes through the display area; and a projection lens 13 that magnifies luminous flux $L_4$ and projects on screen S a rectangular image.

Light source 11 comprises: a first parabolic mirror 14 the reflecting surface of which is directed toward direction z which is the direction of emission of the luminous flux; a lamp 15, the center of luminescence of which is at the focal point of parabolic mirror 14; and a second parabolic mirror 16, the reflecting surface of which is oriented toward parabolic mirror 14. Both first parabolic mirror 14 and second parabolic mirror 16 are concave mirrors having parabolic reflecting surfaces that are rotationally symmetrical about the optical axis A. There is formed in second parabolic mirror 16 an aperture window 17 having a rectangular configuration that, when seen from the front (that is, the direction opposite to the z direction), is substantially similar to that of the image display area of liquid crystal light valve 12. That is, the rectangular aperture window 17 and the rectangular image display area of the light valve 12 have corresponding sides proportional and corresponding angles equal. Further, first parabolic mirror 14 and second parabolic mirror 16 are disposed face-to-face with each other in such a way that their respective optical axes A (shown by the dot-dash line in FIG. 3) are in alignment, and their focal points are in the same position (which may thus be termed a common focal point). Lamp 15 is a metal halide lamp, xenon lamp, halogen lamp or other lamp emitting white light, and has its center of luminescence at this common focal point.

Liquid crystal light valve 12 of this embodiment is of a transmission type, capable of controlling the distribution of the transmitted light. It is disposed between a pair of glass sheets comprising pixel electrodes arranged in a matrix, and a liquid crystal layer. This pair of glass sheets is clamped between a pair of polarizing plates having optical axes at right angles to each other. When the rated voltage V is applied to the pixel electrodes and the optical rotary power of the liquid crystals has decreased, the amount of light passing through the pair of polarizing plates is reduced. Accordingly it is possible, by controlling the voltage applied to each of the pixel elements in the matrix arrangement, to change the distribution of the luminous flux transmitted and thereby to change the image that is projected on the screen. A condenser lens 18 is disposed at the front face of liquid crystal light valve 12.

In the case of the embodiment described above, the beam of light that is emitted by lamp 15 is reflected by parabolic mirror 14 and is emitted from aperture window 17 in a direction parallel to optical axis A. Again, the beam of light that is emitted by lamp 15 and reflected from parabolic mirror 17 is also reflected by parabolic mirror 14 and is emitted from aperture window 17 in a direction parallel to optical axis A. The size of the cross-section of luminous flux $L_3$ emitted from aperture window 17 is reduced by condenser lens 18 and is applied to liquid crystal light valve 12. Luminous flux $L_4$ that has passed through liquid crystal light valve 12 is magnified by projection lens 13 and projected onto screen S.

Referring to FIG. 4, let us explain the principle whereby the parallel luminous flux $L_3$ is emitted from light source 11. FIG. 4 shows light source 11 and liquid crystal light valve 12 of the device in FIG. 3, and further shows the paths followed by three representative beams a, b and c of light emitted from lamp 15.

Light beam a, after being emitted from lamp 15, is reflected by first parabolic mirror 14, passes through aperture window 17. Since the center of luminescence of lamp 15 is located at the focal point of first parabolic mirror 14, the light beam is reflected from first parabolic mirror 14, passes through aperture window 17, and proceeds in parallel with optical axis A.

Figure 1:
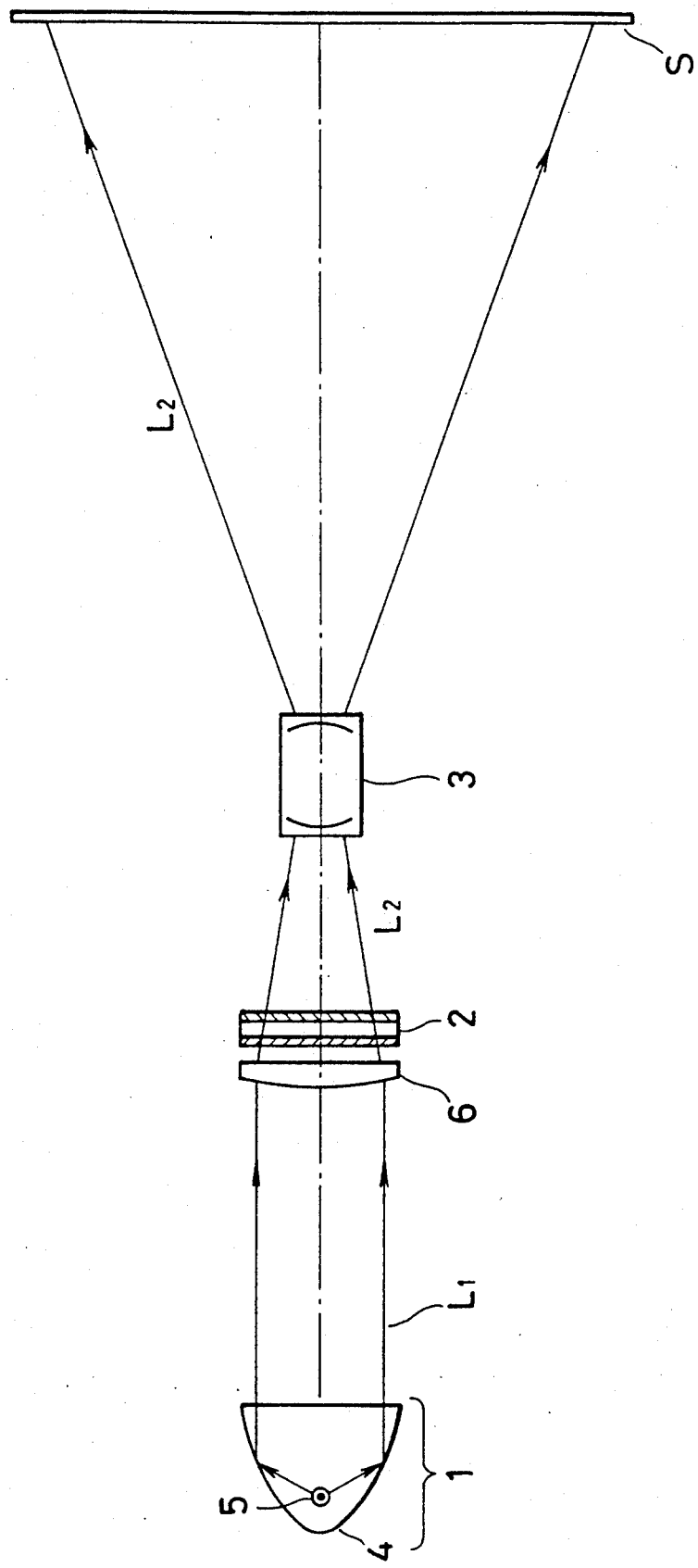
FIG. 1 shows the structure of a conventional projection-type display device.
Figure 2:
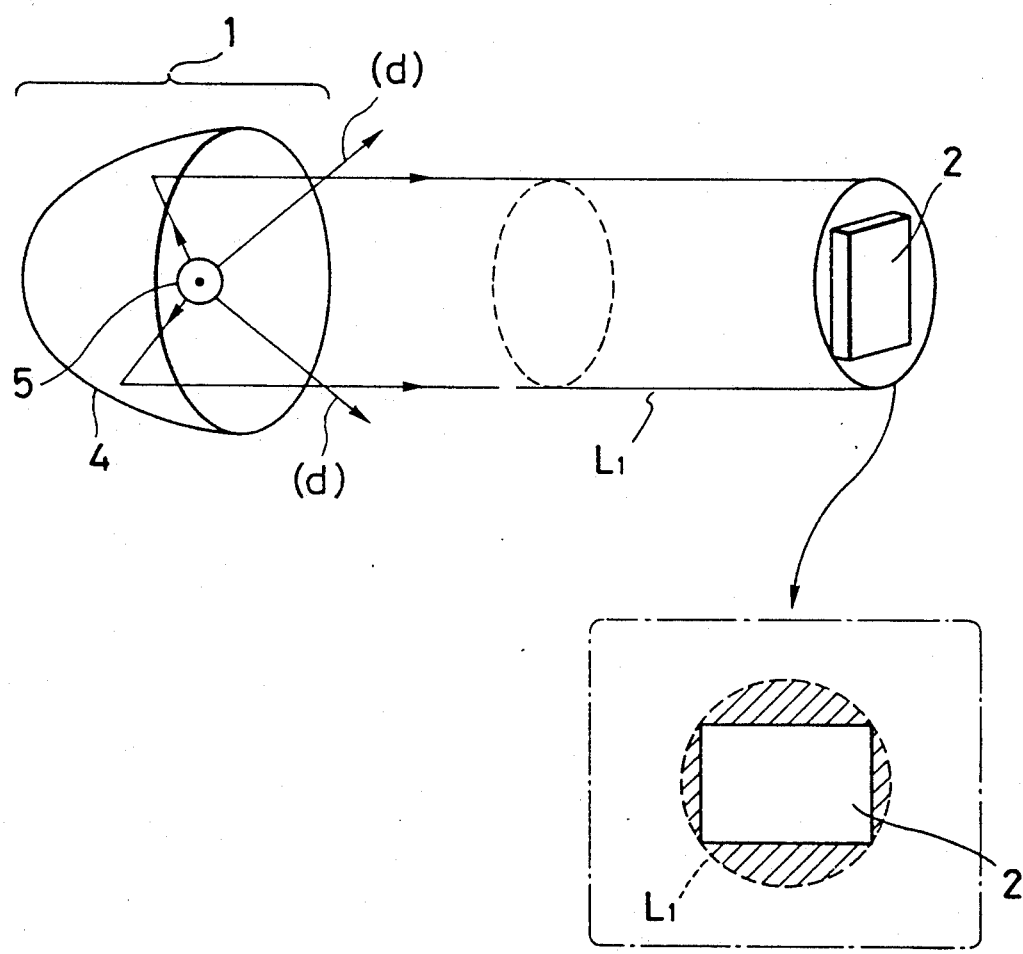
FIG. 2 is a drawing for the purpose of clarifying the problems associated with the device in FIG. 1.

Light beam b shows the case in which, after being emitted from lamp 15, light is reflected by first parabolic mirror 14, and then reflected at a point on first parabolic mirror 14 that is farther distant from optical axis A than is light beam a. Since the center of luminescence of lamp 15 is located at the focal point of first parabolic mirror 14, light beam b that is reflected from first parabolic mirror 14 proceeds in parallel with optical axis A. Light beam b strikes second parabolic mirror 16 without being able to pass through aperture window 17. The light beam b that struck second parabolic mirror 16 passes near the focal point and strikes first parabolic mirror 14. And light beam b that was reflected from the first parabolic mirror 14 passes through aperture window 17 and proceeds in parallel with optical axis A. Note that light beam b represents that part of the beam shown by the cross-hatching in FIG. 2 as having been wasted conventionally.

Light beam c shows the case in which, after being emitted from lamp 15, light strikes second parabolic mirror 16. Light beam c is reflected by second parabolic mirror 16, proceeds in parallel with optical axis A (in the direction opposite to the z direction), and strikes first parabolic mirror 14. Light beam c is reflected by first parabolic mirror 14, passes through its focal point, is reflected at another point on first parabolic mirror 14, and proceeds in parallel with optical axis A through aperture window 17.

In this way the parallel luminous flux $L_3$ is obtained. The cross-sectional configuration of parallel luminous flux $L_3$ is the same as the configuration of aperture window 17. Accordingly, the configuration of aperture window 17 should be substantially similar to the configuration of the display area of liquid crystal light valve 12. The cross section of luminous flux $L_3$ is slightly reduced by condenser lens 18 as shown in FIG. 4. It is also possible, however, not to provide condenser lens 18, in which case the dimensions of aperture window 17 and those of the display area of liquid crystal light valve 12 are made identical.

Following is a description of the structure of light source 11.

Parabolic mirrors 14 and 16 may be molded from aluminum (Al) or other metal, or may be produced by grinding. Alternatively, they may also be made of glass, with the inner surface provided with a reflective film.

Aperture window 17 of parabolic mirror 16 may be a simple hole with nothing in it, or it may be a transparent glass.

The beam of light that is to impinge on liquid crystal light valve 12 is visible light. It is therefore desirable that first parabolic mirror 14 be provided with a coating that selectively reflects visible light (wavelengths of 400 nm–700 nm), and that second parabolic mirror 16 have a coating that is reflective over a broad range (wavelengths of 200 nm–1000 nm with a reflection factor of 90%).

When aperture window 17 is of transparent glass, the glass may be provided with a coating that is non-reflective to visible light (wavelengths of 400 nm–700 nm) and/or with a coating capable of reflecting ultraviolet (wavelengths below 400 nm) and infrared (wavelengths above 700 nm).

Parabolic mirrors 14 and 16 may be attached by welding at the points designated by reference numerals 19 in FIG. 4. When aperture window 17 is of transparent glass, the space between parabolic mirrors 14 and 16 may be hermetically sealed and charged with an inert gas such as nitrogen ($N_2$) or argon (Ar), thus providing oxidation protection for the electrodes and leads of lamp 15.

Figure 5B:
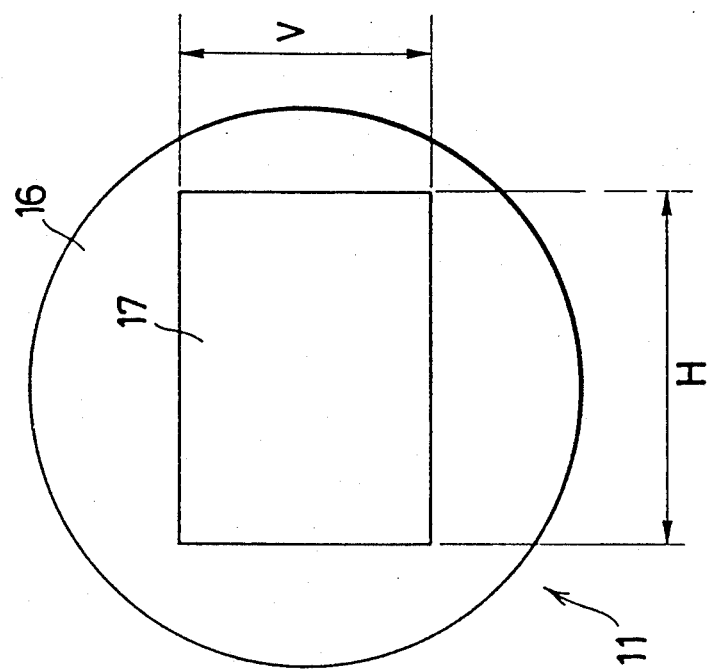
FIGS. 5A and 5B are drawings for the purpose of explaining the method for establishing the configuration of the embodiment in FIG. 3.
Figure 5A:
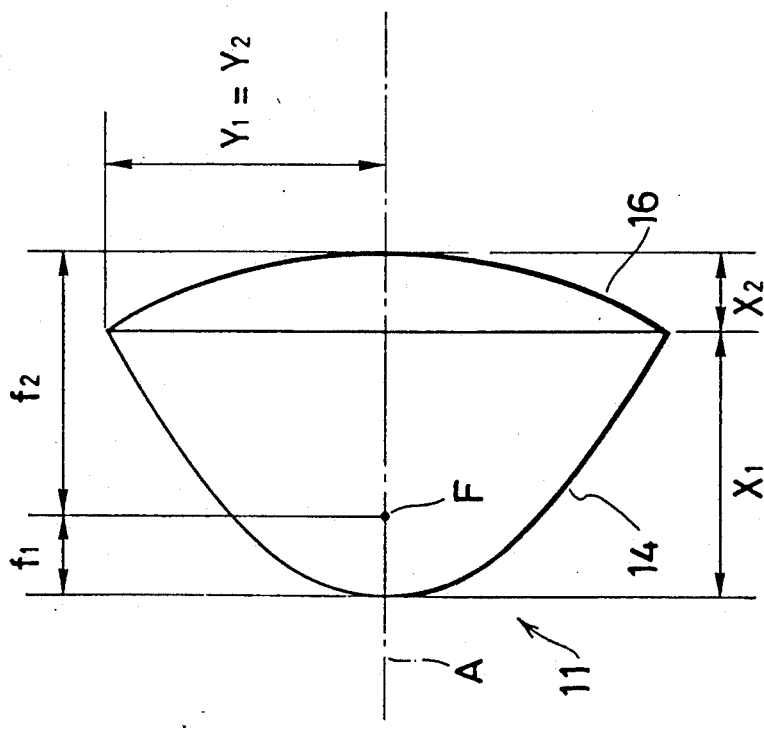

Following is an explanation, based on FIGS. 5A and 5B, of the method of establishing the dimensions of parabolic mirrors 14 and 16.

In the Figures, a symbol $X_1$ designates the depth of first parabolic mirror 14, $X_2$ designates the depth of second parabolic mirror 16, $Y_1$ and $Y_2$ respectively designate the radii of the aperture portions of parabolic mirrors 14 and 16, $f_1$ designates the focal length of first parabolic mirror 14, $f_2$ designates the focal length of second parabolic mirror 16, and F designates the common focal point of first parabolic mirror 14 and second parabolic mirror 16. In this case the following equations are valid:

$$X_1 + X_2 = f_1 + f_2 \quad (1)$$

$$Y_1 = Y_2 \quad (2)$$

$$Y_1^2 = 4 f_1 X_1 \quad (3)$$

$$Y_2^2 = 4 f_2 X_2 \quad (4)$$

From the Equations (1) to (4), we obtain $$(f_2 + f_1)(f_2 - X_1) = 0 \quad (5)$$

If both $f_1$ and $f_2$ are assigned positive values, it can be seen from Equation (5) that $$f_2 = X_1 \quad (6)$$

Substituting Equation (6) in Equation (1), we obtain $$X_2 = f_1 \quad (7)$$

Accordingly, by mounting face to face the first parabolic mirror 14 having a depth equal to the focal length of the second parabolic mirror 16, and the second parabolic mirror 16 having a depth equal to the focal length of the first parabolic mirror 14, the structure shown in FIG. 5A is obtained.

As a specific example, in a case in which $f_1 = 12.5$ mm, $Y_1 = 46.5$ mm and $X_1 = 43.245$ mm, we would have $f_2 = 43.245$ mm, $Y_2 = 46.5$ mm, and $X_2 = 12.5$ mm.

If, further, $f_2$ is made greater than $f_1$, increasing the luminous flux emitted by first parabolic mirror 14 at a single reflection, emission efficiency is increased.

FIG. 5B shows light source 11 as seen from the front (from the right side in FIG. 5A), in which the ration H:V between the long and short sides of aperture window 17 is similar to that of the rectangular display area of the liquid crystal light valve.

In the embodiment that is shown in FIG. 3 and has been described above, the luminous flux that has been wasted in conventional projection-type display devices (beams b and c in FIG. 4) can be directed by second parabolic mirror 16 to first parabolic mirror 14, where it is reflected and emitted from aperture window 17 so that it impinges in the rectangular display area of liquid crystal light valve 12. This makes it possible to increase the brightness of the projected image.

Figure 6:
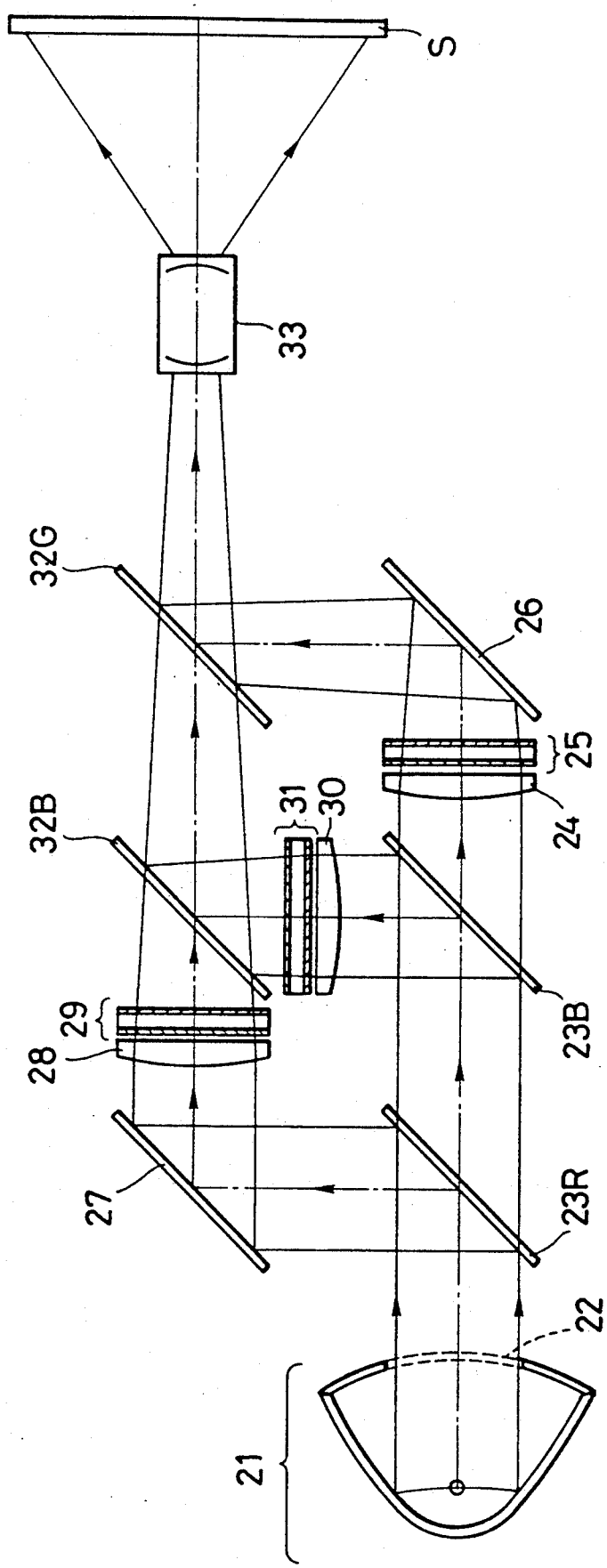
FIG. 6 shows a projection-type display device incorporating the same light source as in FIG. 3, and capable of producing a color display.

Following is a description of another embodiment of the present invention based on FIG. 6.

This projection-type display device can project a color image on screen S. Light source 21 is of the same structure as the light source 11 in FIG. 4. In front of aperture window 22 of light source 21 are disposed dichroic mirrors 23R and 23B for the purpose of color separation, condenser lens 24 and liquid crystal light valve 25, and reflecting mirror 26. Also disposed in this device, in the arrangement shown in FIG. 6, are a reflecting mirror 27, a condenser lens 28 and liquid crystal light valve 29, a condenser lens 30 and liquid crystal light valve 31, dichroic mirrors 32B and 32G for the purpose of color synthesis, and projection lens 33.

Dichroic mirror 23R is a red dichroic mirror, reflecting only red light while allowing light of other colors to pass through. Dichroic mirrors 23B and 32B are blue dichroic mirrors, reflecting only blue light while allowing light of other colors to pass through. Dichroic mirror 32G is a green dichroic mirror, reflecting only green light while allowing light of other colors to pass through.

Liquid crystal light valves 25, 29 and 31 are of the same structure as liquid crystal light valve 12 in FIG. 3.

The luminous flux emitted from light source 21 has a rectangular cross section, in the same way as was shown in FIGS. 3 and 4, and is a white light having red, blue and green components. At dichroic mirror 23R the red component of this luminous flux is reflected, while the blue and green components pass through. The direction of the reflected red light is changed by reflecting mirror 27 so that it passes through condenser lens 28 and impinges on liquid crystal light valve 29. The luminous flux that has passed through liquid crystal light valve 29 passes through dichroic mirrors 32B and 32G and impinges on projection lens 33.

At dichroic mirror 23B, the blue component of the luminous flux that has passed through dichroic mirror 23R is reflected and the green component passes through. The reflected blue light passes through condenser lens 30 and impinges on liquid crystal light valve 31. Light that has passed liquid crystal light valve 31 changes direction through being reflected at dichroic mirror 32B, and passes through dichroic mirror 32G, impinging on projection lens 33.

The light that has passed through dichroic mirror 23B passes through condenser lens 24 to impinge on liquid crystal light valve 25. Light that has passed liquid crystal light valve 25 changes direction through being reflected at reflecting mirror 26 and dichroic mirror 32G, impinging on projection lens 33.

Projection lens 33 magnifies the red, blue and green luminous fluxes, projecting a color image on screen S.

In this case as well, a rectangular luminous flux, such as is shown in FIG. 3, is emitted from light source 21; luminous flux is not blocked wastefully, but increases the brightness of the display.

Figure 7:
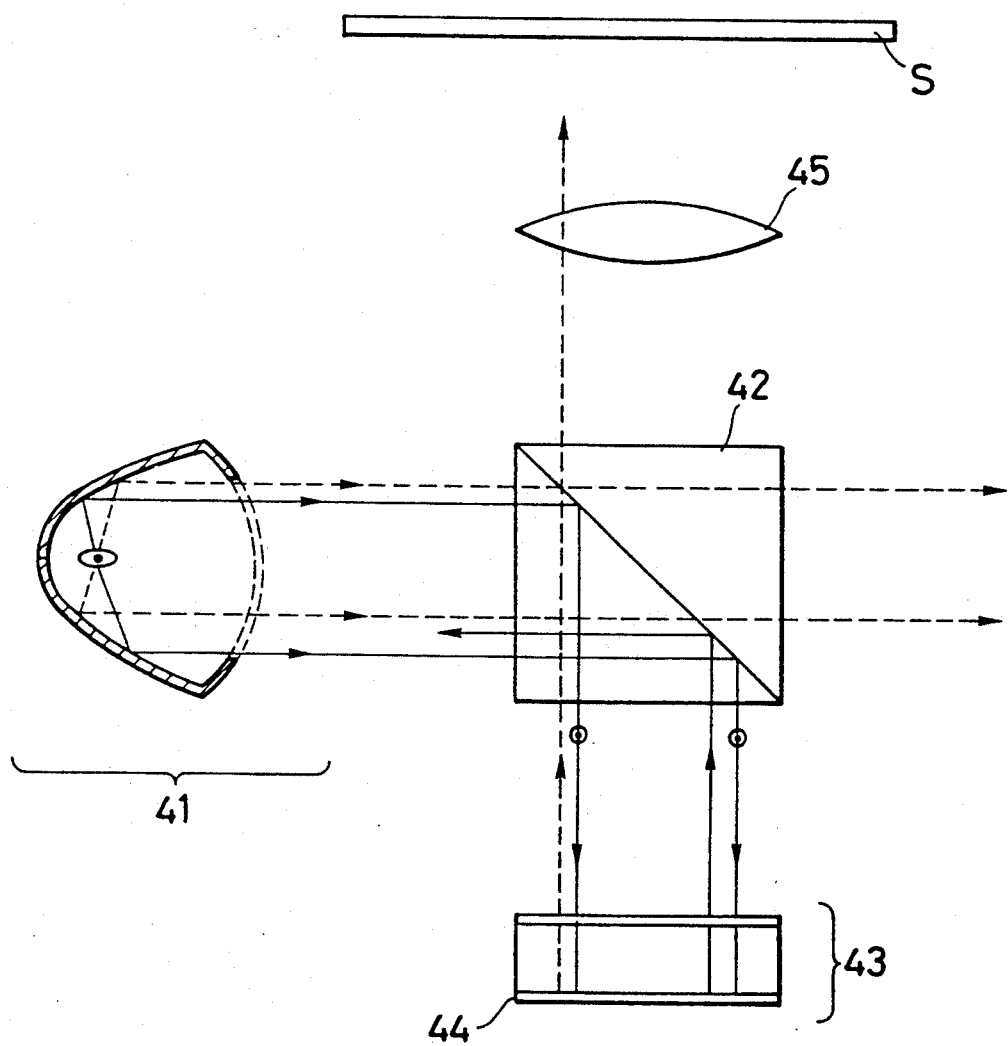
FIG. 7 shows a projection-type display device incorporating the same light source as in FIG. 3 and reflection-type liquid crystal light valve.

Following is a description of another embodiment using a reflection-type liquid crystal light valve, based on FIG. 7.

Light source 41 is of the same structure as the light source 11 shown in FIG. 4, and emits a luminous flux of rectangular cross section. The rectangular luminous flux emitted from light source 41 impinges on polarization beam splitter 42, which is characterized by allowing p-polarized light (shown by broken lines) to pass through and reflecting s-polarized light (shown by solid lines). The luminous flux that has impinged on polarization beam splitter 42 causes s-polarized light to be reflected and impinge on reflection-type liquid crystal light valve 43, which has a rectangular display area in which a plurality of pixel electrodes are arranged in the form of a matrix. Glass substrate 44 of reflection-type liquid crystal light valve 43 is a reflecting mirror.

In that portion of the pixel electrode matrix to which a voltage in excess of a threshold value is not applied, s-polarized light impinging on reflection-type liquid crystal light valve 43 becomes p-polarized light having a plane of polarization rotated through 90°. The p-polarized light passes through the polarization beam splitter 42, impinges on projection lens 45, and is projected on screen S.

In that portion of the pixel electrode matrix to which a voltage in excess of a threshold voltage is applied, the optical rotary power due to the liquid crystals is small, and s-polarized light impinging on reflection-type liquid crystal light valve 43 returns unchanged to polarization beam splitter 42 as s-polarized light. This s-polarized light cannot continue in a straight line through beam splitter 42, and is not projected on screen S.

And, as in the case shown in FIG. 3, luminous flux is not blocked wastefully, but increases the brightness of the display.

Following is a description of another embodiment of the present invention based on FIGS. 8, 9, 10A and 10B.

The light source of this device has a structure that differs from that of the device shown in FIG. 3. Since the structure, except for light source 51, is the same as that in FIG. 3, structural elements other than light source 51 are designated by the same reference numerals as in FIG. 3.

Light source 51 comprises: a parabolic mirror 54 oriented in the direction of luminous flux emission (the z direction); a lamp 55 with its center of luminescence at the focal point of parabolic mirror 54; and a spherical mirror 56 with its reflective surface disposed face to face with parabolic mirror 54. Parabolic mirror 54 is a concave mirror formed of a symmetrical paraboloid of revolution centered on the optical axis A. Spherical mirror 56, too, is a concave mirror centered on the optical axis. In the spherical mirror 56 is formed an aperture window 57 of a rectangular configuration substantially similar to the rectangular display area of liquid crystal light valve 12, when viewed from the front (the direction opposite to the z direction). Also, parabolic mirror 54 and spherical mirror 56 are disposed face to face, in order that their respective optical axes A are in alignment (shown by a dot-dash line in FIG. 8), and that the focal point of parabolic mirror 54 and the center of curvature of the spherical mirror 56 are in the same position (which may thus be termed a common point). Lamp 55 is a metal halide lamp, xenon lamp, halogen lamp or other lamp emitting white light, and has its center of luminescence at this common point.

In this embodiment, the beam of light emitted by lamp 55 is reflected by parabolic mirror 54 and is emitted from aperture window 57 as a light beam parallel to optical axis A. Similarly, the beam of light emitted by lamp 55 and reflected by spherical mirror 56 is also reflected by parabolic mirror 54 and is emitted from aperture window 57 as a light beam parallel to optical axis A. Luminous flux $L_3$, which has been emitted from aperture window 57, is reduced in cross section by condenser lens 18 and impinges on liquid crystal light valve 12. Luminous flux $L_4$, which has passed through liquid crystal light valve 12, is magnified by projection lens 13 and projected onto screen S.

Figure 8:
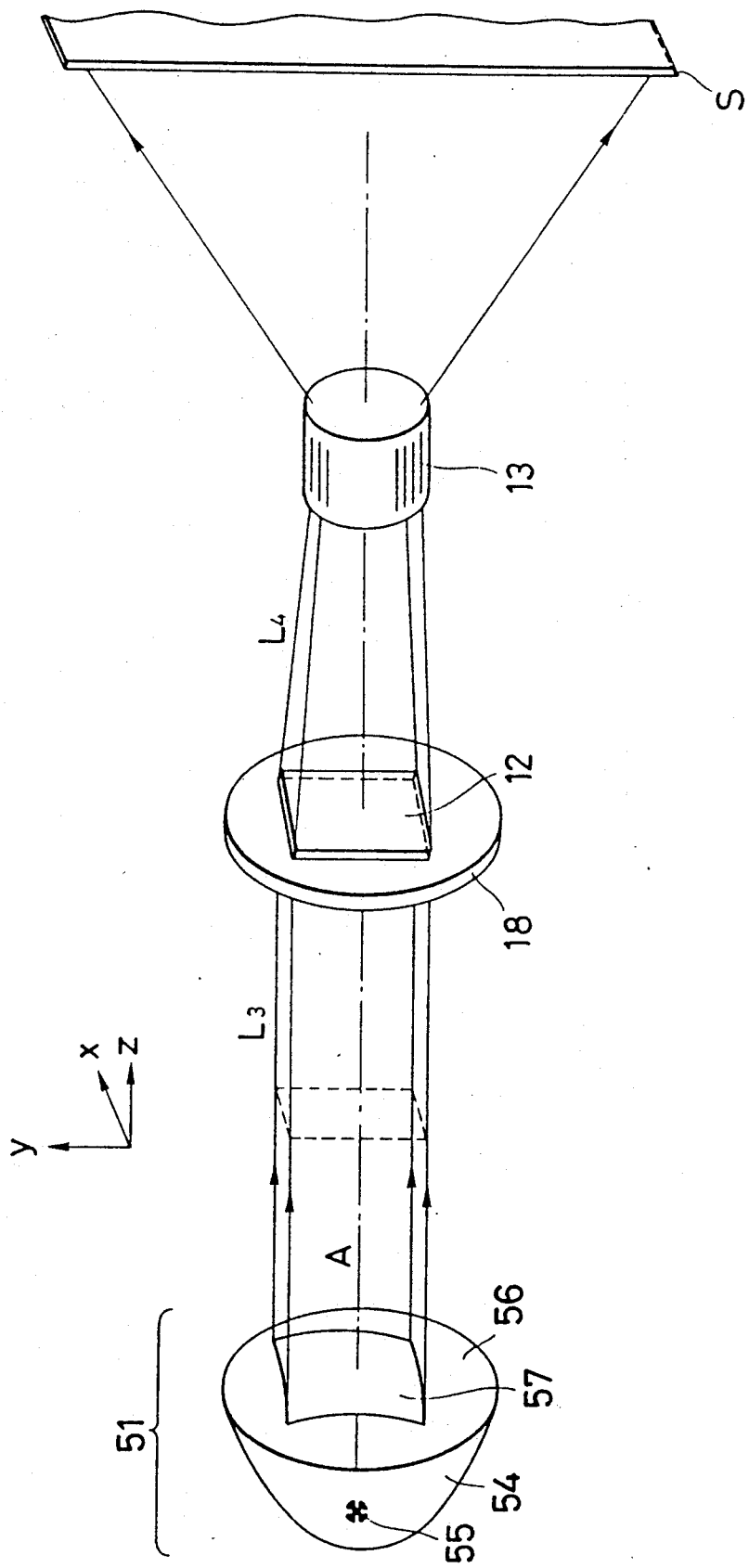
FIG. 8 shows the structure of another embodiment of the present invention.
Figure 9:
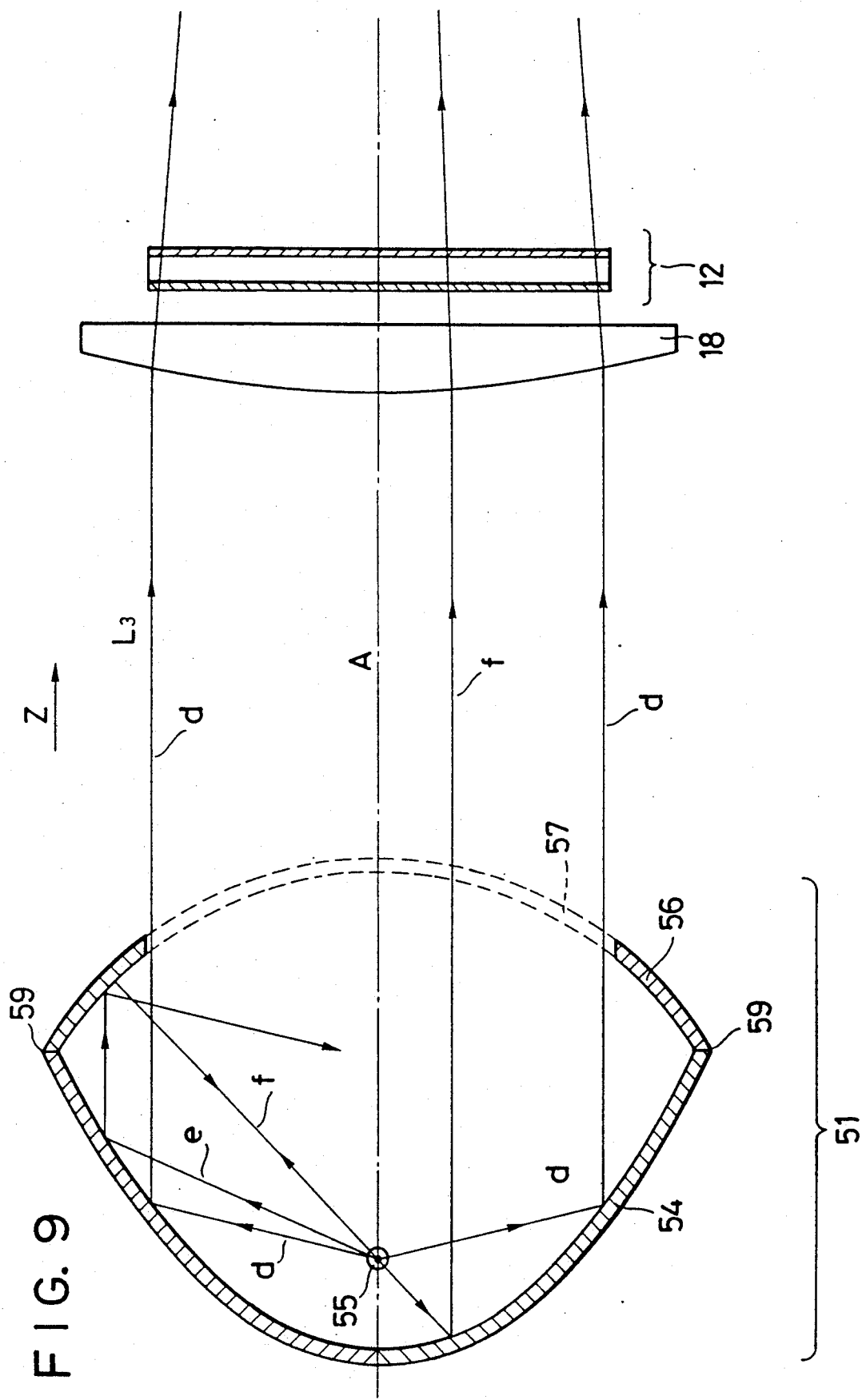
FIG. 9 shows the path of the luminous flux in the embodiment in FIG. 8.

Let us then explain, based on FIG. 9, the principle on which parallel luminous flux $L_3$ is emitted from light source 51. FIG. 9 shows light source 51 and liquid crystal light valve 12 of the device in FIG. 8, as well as the paths of three representative light beams d, e and f emitted from lamp 55.

Light beam d is emitted from lamp 55, and then, after being reflected at parabolic mirror 54, passes aperture window 57. Since the center of luminescence of lamp 55 is located at the same point as the focal point of parabolic mirror 54, the light beam that is reflected by parabolic mirror 54 and passes aperture window 57 proceeds parallel to optical axis A.

Light beam e shows the case in which light is emitted from lamp 55, and then is reflected at a point on parabolic mirror 54 that is farther separated from optical axis A than is light beam d. In this case we do not have a parallel luminous flux, and no contribution is made to screen projection.

Light beam f shows the case in which light is emitted from lamp 55 and strikes spherical mirror 56. When light beam f is reflected by spherical mirror 56, it returns by the same path, passing near the common point and impinging on parabolic mirror 54. This light beam f is reflected by the parabolic mirror 54 and proceeds parallel to optical axis A through aperture window 57.

In this way above described a parallel luminous flux $L_3$ is obtained, having a cross-sectional configuration the same as the configuration of aperture window 57. Accordingly, the configuration of aperture window 57 is substantially similar to the display area of liquid crystal light valve 12.

Parabolic mirror 54 and spherical mirror 56 may be attached by welding at the points designated by reference numerals 59 in FIG. 9. When aperture window 57 is of transparent glass, the space between mirrors 54 and 56 may be hermetically sealed and charged with an inert gas, thus providing oxidation protection for the electrodes and leads of lamp 55.

Figure 10:
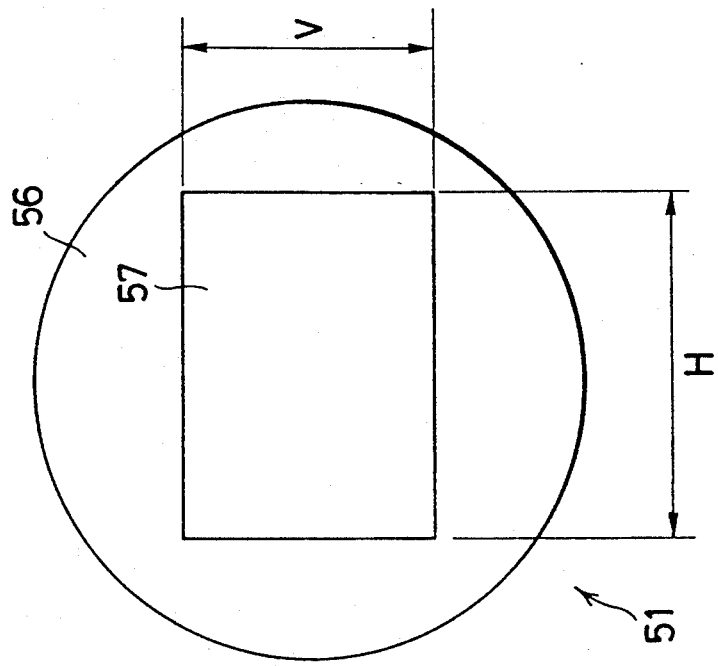
FIGS. 10A and 10B are drawings for the purpose of explaining the method for establishing the configuration of the embodiment in FIG. 8.
Figure 10:
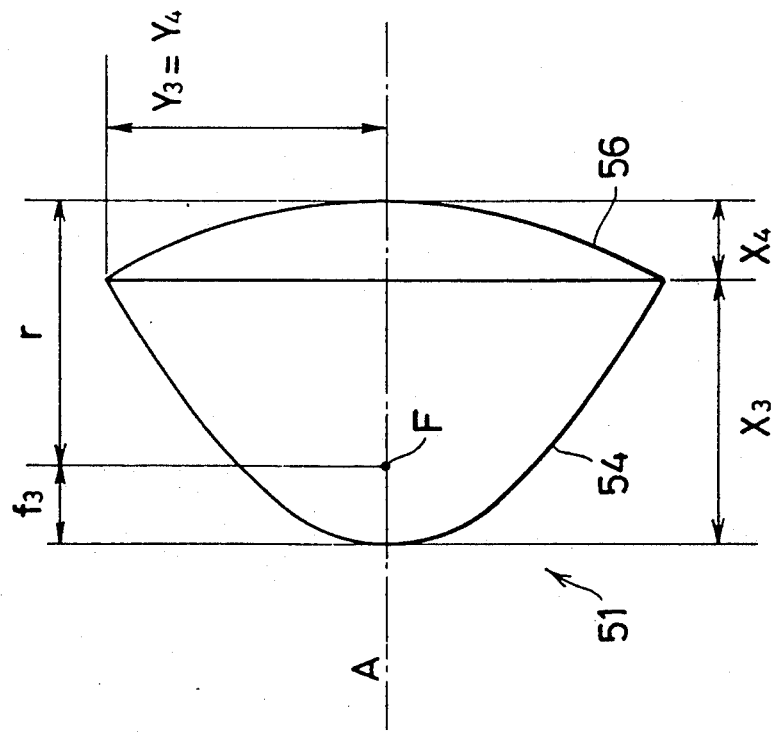

Following is a description of the method of establishing the dimensions of parabolic mirror 54 and spherical mirror 56, based on FIGS. 10A and 10B.

In the Figures, a symbol $X_3$ designates the depth of parabolic mirror 54, $X_4$ designates the depth of spherical mirror 56, $Y_3$ and $Y_4$ respectively designate the radii of the aperture portions of parabolic mirror 54 and spherical mirror 56, $f_3$ designates the focal length of parabolic mirror 54, r designates the radius of curvature of spherical mirror 56, and F designates a common point (the focal point of parabolic mirror 54 and the center of curvature of spherical mirror 56). In this case the following equations are valid:

$$X_3 + X_4 = f_3 + r \tag{8}$$

$$Y_3 = Y_4 \tag{9}$$

$$Y_3^2 = 4f_3 X_3 \tag{10}$$

$$r^2 = (X_3 - f_3)^2 + Y_3^2 \tag{11}$$

From the Equations (10) and (11), we obtain $$r^2 = (X_3 + f_3)^2 \tag{12}$$

If r is given a positive value, we can obtain following equation from Equation (12).

$$r = X_3 + f_3 \tag{13}$$

Substituting Equation (13) in Equation (8), we have $$X_4 = 2f_3 \tag{14}$$

Accordingly, by mounting a parabolic mirror 54 face to face with a spherical mirror 56 having a depth double the focal length of parabolic mirror 54, the structure shown in FIG. 10A is obtained.

As a specific example, in a case in which $f_3 = 12.5$ mm, $Y_3 = 46.5$ mm and $X_3 = 43.245$ mm, we would have $r = 55.745$ mm, $Y_4 = 46.5$ mm, and $X_4 = 25.0$ mm.

FIG. 10B shows light source 51 as seen from the front (from the right side in FIG. 10A), in which the ratio H:V between the long and short sides of aperture window 57 is virtually the same as that of the rectangular display area of the liquid crystal light valve.

In the embodiment shown in FIG. 8 and described above, the luminous flux that was wasted in the conventional projection-type display device can be emitted from aperture window 57 to impinge on the rectangular display area of liquid crystal light valve 12, and the brightness of the projected image can be increased.

Figure 11:
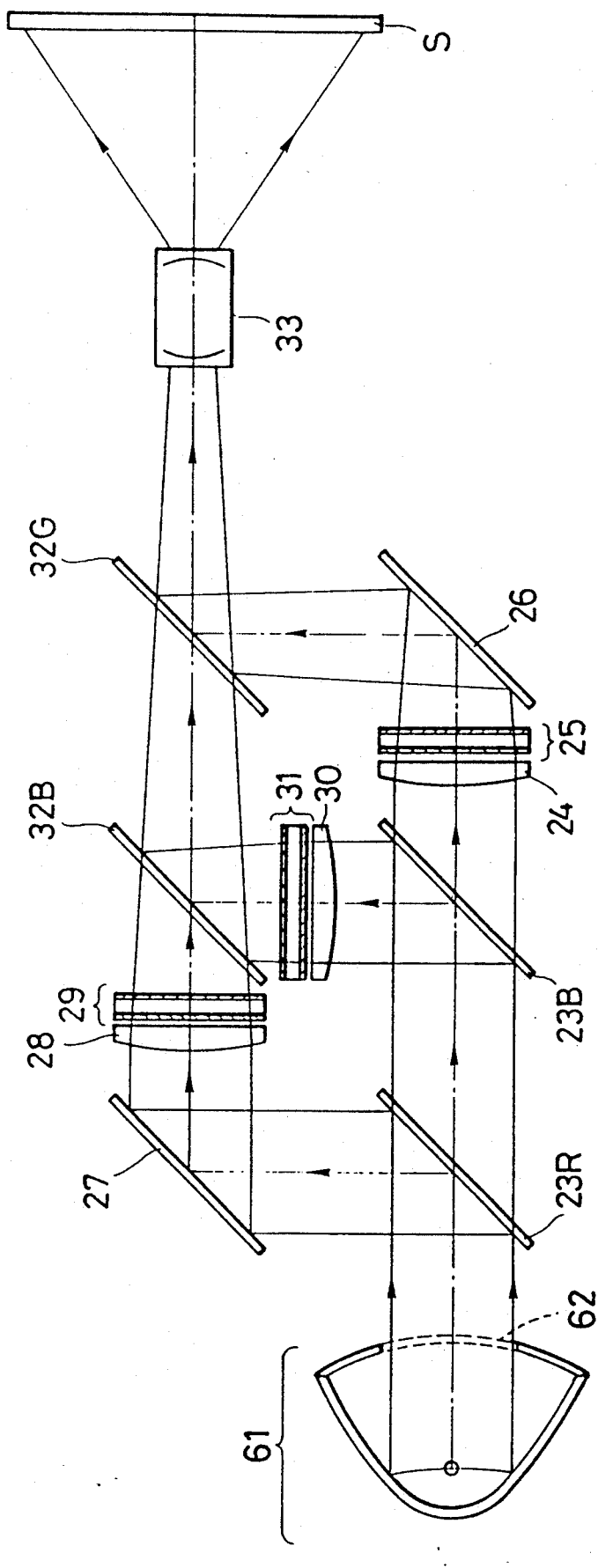
FIG. 11 shows a projection-type display device incorporating the same light source as in FIG. 8.
Figure 12:
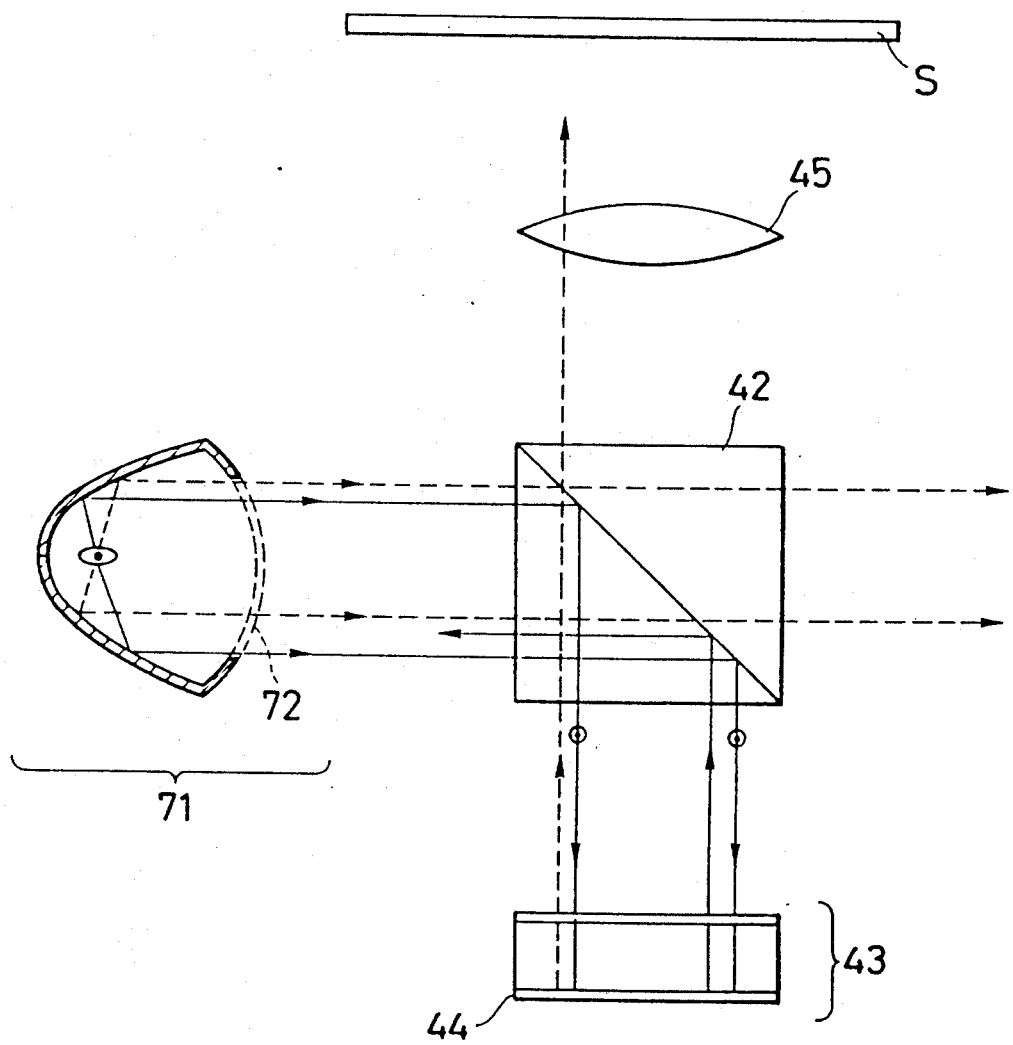
FIG. 12 shows a projection-type display device incorporating the same light source as in FIG. 8 and reflection-type liquid crystal light valve.

Following is a description of another embodiment of the present invention, based on FIG. 11.

The light source of this device has a structure that differs from that of the device shown in FIG. 6. Since the structure, except light source 61, is the same as that in FIG. 6, structural elements other than light source 61 are designated by the same reference numerals as in FIG. 6. Light source 61 is of the same structure as light source 51 in FIG. 9.

In this case, projection lens 33 magnifies a red, a blue and a green luminous flux, projecting a color image in screen S. And, as in the case shown in FIG. 8, luminous flux is not blocked wastefully, but increases the brightness of the display.

Following is a description of another embodiment using a reflection-type liquid crystal light valve 43.

The light source of this device has a structure that differs from that of the device shown in FIG. 7. Since the structure, except light source 71, is the same as that in FIG. 7, structural elements other than light source 71 are designated by the same reference numerals as in FIG. 7. Light source 71 is of the same structure as light source 51 in FIG. 9.

In this case, as in the case shown in FIG. 8, a luminous flux of rectangular cross section is emitted from rectangular aperture window 72. Accordingly, luminous flux is not blocked wastefully, but increases the brightness of the display.

Following is a description of another embodiment of the present invention, based on FIGS. 13 to 18.

This device represents an improvement over the device shown in FIG. 8. In the device shown in FIG. 8, light beam e did not become a parallel luminous flux, as can be seen from FIG. 9. The device shown in FIG. 13 remedies this defect. The light source of the device shown in FIG. 13 differs from that of the device shown in FIG. 8. Since the structure, except light source 81, is the same as that in FIG. 8, structural elements other than light source 81 are designated by the same reference numerals as in FIG. 8.

Light source 81 is composed of: a parabolic mirror 84; a lamp 85 having is center of luminescence at the focal point of this parabolic mirror 84; and a spherical mirror 86 with a reflective surface disposed face to face in relation to parabolic mirror 84.

Figure 18:
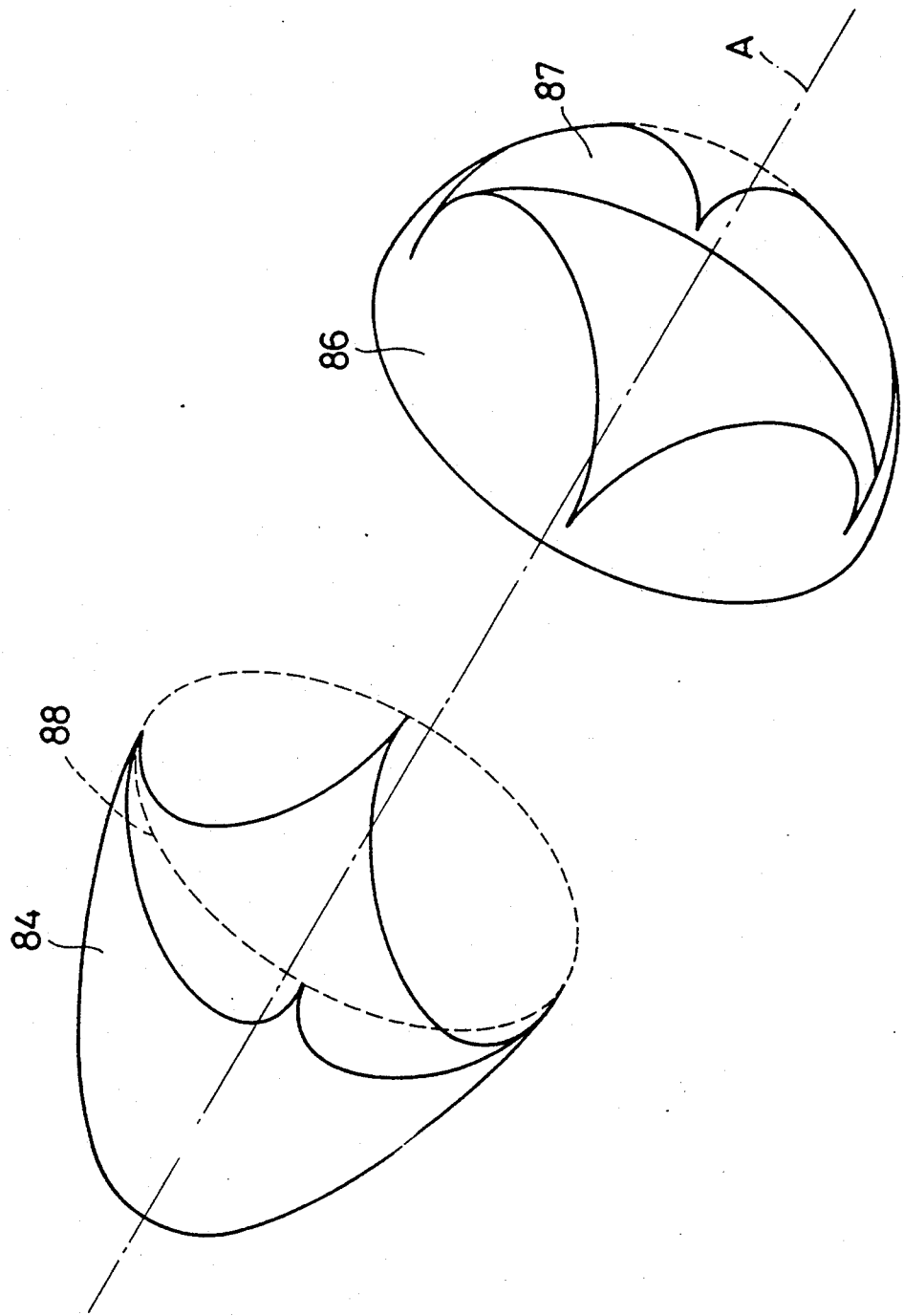
FIG. 18 is an external perspective view of parabolic mirror and spherical mirror of the embodiment in FIG. 13.

Parabolic mirror 84 is a concave mirror, the reflective surface of which is a paraboloid, and which is made so that, when viewed from the front (the opposite direction to the z direction) it has a rectangular configuration substantially similar to the image display area of liquid crystal light valve 12 (FIG. 15B). In FIG. 18 is shown an external perspective view of parabolic mirror 84. Accordingly parabolic mirror 84 has the structure of symmetrical paraboloid of revolution centered on the optical axis A (similar to the structure of parabolic mirror 54 in FIG. 9), from which the portion designated by the reference numeral 88 in FIG. 18 has been cut away.

Spherical mirror 86 is a symmetrical concave mirror rotated about the optical axis A, in which is formed an aperture window 87 which, when viewed from the front (the opposite direction to the z direction) has a rectangular configuration substantially similar to the image display area of liquid crystal light valve 12 (FIG. 15C). In FIG. 18 is shown an external perspective view of spherical mirror 86.

Also, parabolic mirror 84 and spherical mirror 86 are disposed face to face, in order that their respective optical axes A are in alignment (shown by a dot-dash line in FIG. 13), and that the focal point of parabolic mirror 84 and the center of curvature of the spherical mirror 86 are in the same position (which may thus be termed a common point). Lamp 85 has its center of luminescence at this common point.

In this embodiment, the beam of light emitted by lamp 85 is reflected by parabolic mirror 84 and is emitted from aperture window 87 as a light beam parallel to optical axis A.

Similarly, the beam of light emitted from lamp 55 and reflected by spherical mirror 86 is also reflected by parabolic mirror 84 and is emitted from aperture window 87 as a light beam parallel to optical axis A. Luminous flux $L_3$, which has been emitted from aperture window 87, is reduced in cross section by condenser lens 18 and impinges on liquid crystal light valve 12. Luminous flux $L_4$, which has passed through liquid crystal light valve 12 is magnified by projection lens 13 and projected on screen S.

Figure 14:
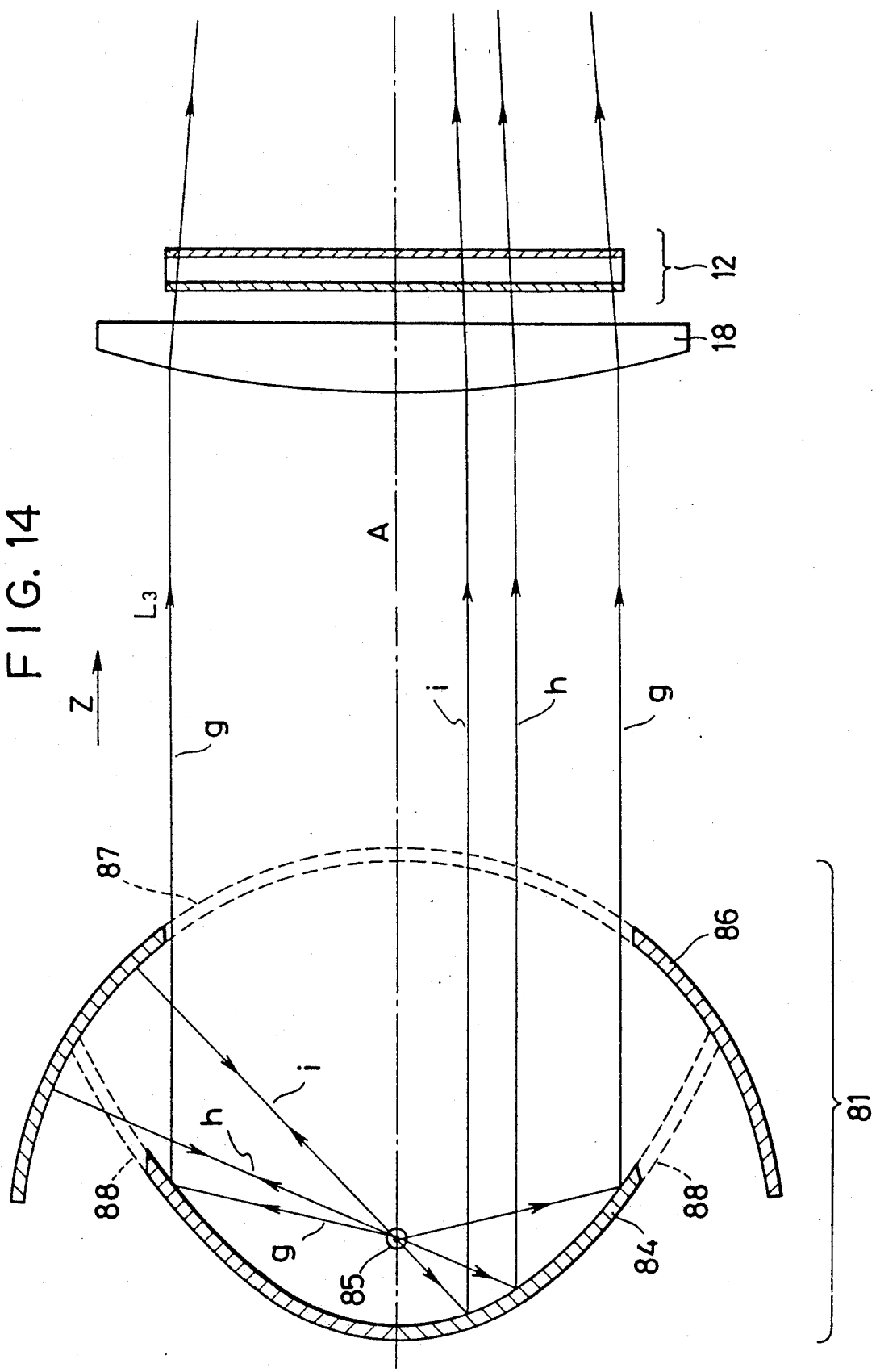
FIG. 14 shows the path of the luminous flux in the embodiment in FIG. 13.
Figure 15:
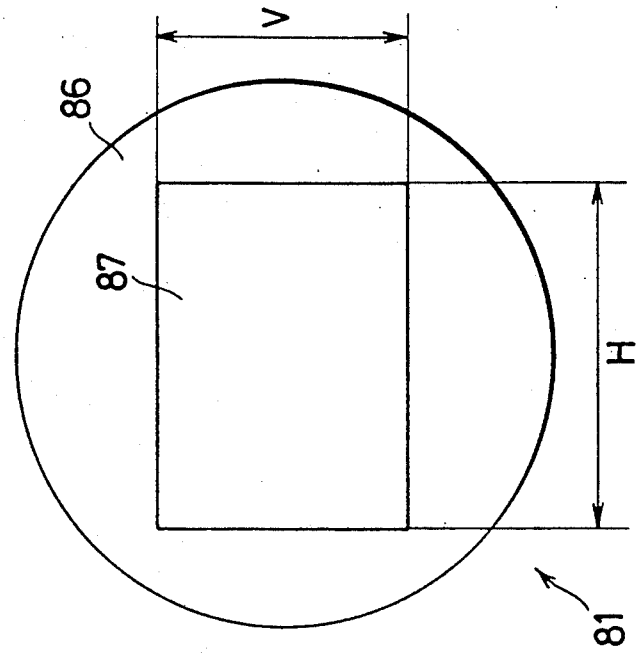
FIGS. 15A, 15B and 15C are drawings for the purpose of explaining the method for establishing the configuration of the embodiment in FIG. 13.
Figure 15:
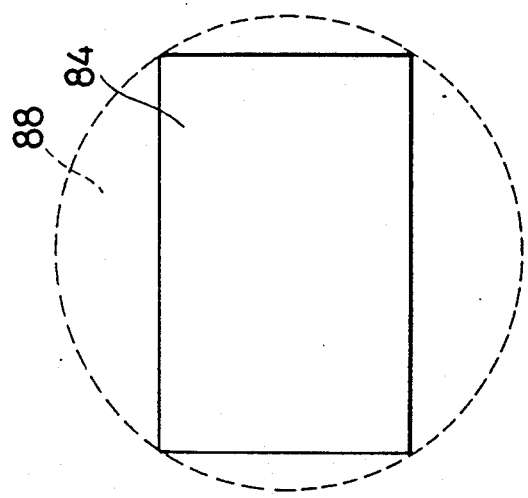
Figure 15:
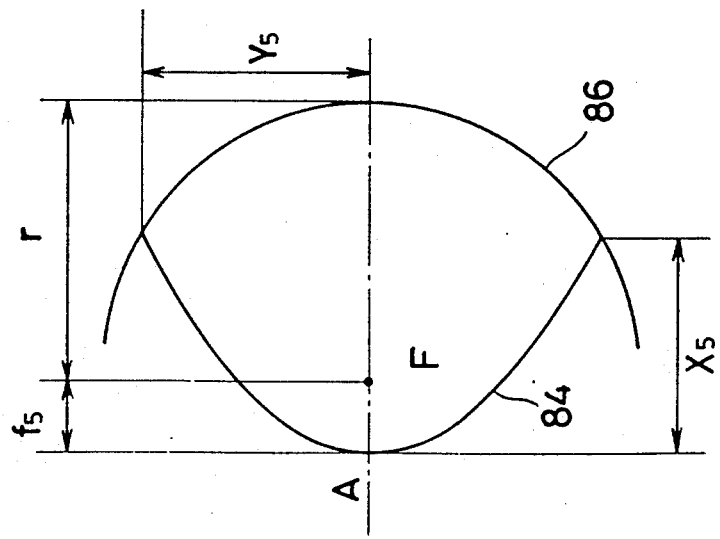

Let us then explain, based on FIG. 14, the principle on which parallel luminous flux $L_3$ is emitted from light source 81. FIG. 14 shows the paths of three representative light beams g, h and i emitted from lamp 85.

Light beam g is emitted from lamp 85, and then, after being reflected at parabolic mirror 84, passes through aperture window 87. Since the center of luminescence of lamp 85 is located at the same point as the focal point of parabolic mirror 84, the light beam g that is reflected by parabolic mirror 84 and passes aperture window 87 proceeds parallel to optical axis A.

Light beam h corresponds to light beam e in FIG. 9. The light beam h is emitted from lamp 85, passes through cutaway portion 88 of parabolic mirror 84 and strikes spherical mirror 86, where it is reflected back along the same path through near the common point and impinges on parabolic mirror 84. This light beam h is reflected by parabolic mirror 84 and proceeds parallel to optical axis A, passing aperture window 87.

Light beam i, which corresponds to the light beam f in FIG. 9, shows the case in which light is emitted from lamp 86 and strikes spherical mirror 8. When light beam i is reflected by spherical mirror 86, it returns by the same path, passing near the common point and impinging on parabolic mirror 84. This light beam i is reflected and proceeds parallel to optical axis A through aperture window 87.

In this way above described a parallel luminous flux $L_3$ is obtained, having a cross-sectional configuration the same as the configuration of aperture window 87. What is more, in the case shown in FIG. 14, it is possible to emit as a parallel luminous flux a portion of the light which had been subject to forward scattering (light beam h and i), further increasing the brightness of the projected image.

Parabolic mirrors 84 and spherical mirror 86 may be molded from Al or other metal, or may be produced by grinding. Alternatively, they may also be made of glass, with the inner surface provided with a reflective coating.

Aperture window 87 of spherical mirror 86 may be a simple hole with nothing in it, or it may be a transparent glass. Again, in the event the parabolic mirror 84 is formed from glass, cutaway portion 88 may be of transparent glass to which no reflective coating film has been applied.

Following is a description of the method of establishing the dimensions of parabolic mirror 84, based on FIGS. 15A and 15C.

In the Figures, a symbol $X_5$ designates the depth of parabolic mirror 84, $Y_5$ designates the radius of the aperture portion of parabolic mirror 84, $f_5$ designates the focal distance of parabolic mirror 84, r designates the radius of curvature of spherical mirror 86, and F designates the common point (the focal point of parabolic mirror 84 and the center of curvature of spherical mirror 86. In this case the following equations are valid:

$$Y_5^2 = 4f_5 X_5 \quad (15)$$

$$r^2 = (X_5 - f_5)^2 + Y_5^2 \quad (16)$$

From the Equations (15) and (16), we obtain $$r^2 = (X_5 + f_5)^2 \quad (17)$$

If r is given a positive value, we can see from Equation (17) that $$r = X_5 + f_5 \quad (18)$$

Figure 16B:
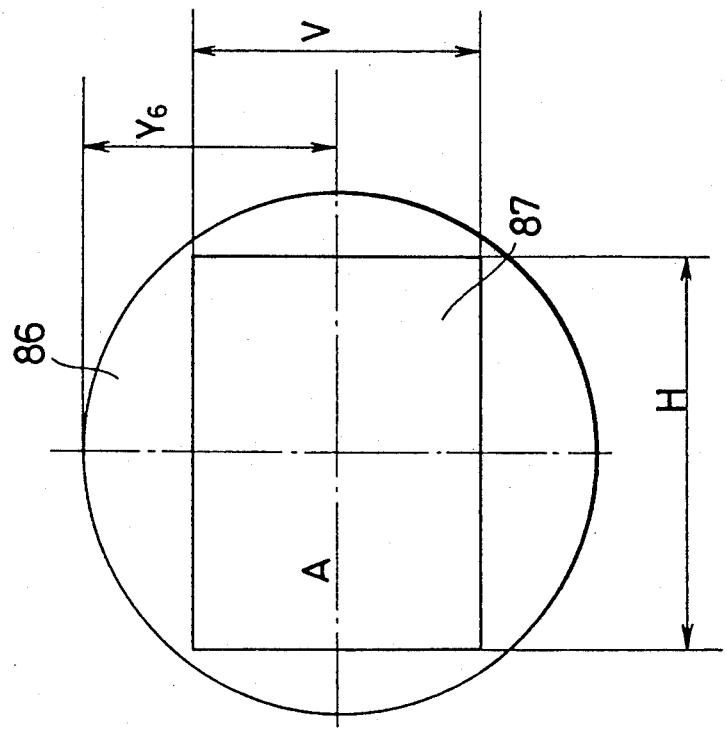
FIGS. 16A and 16B are drawings for the purpose of explaining the method for establishing the configuration of the spherical mirror of the embodiment in FIG. 13.
Figure 16A:
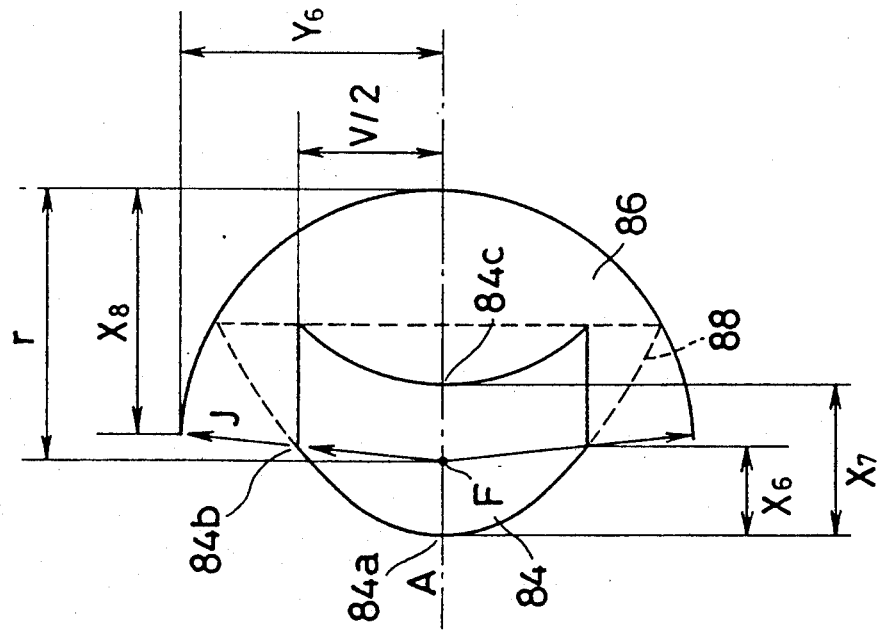
Figure 17:
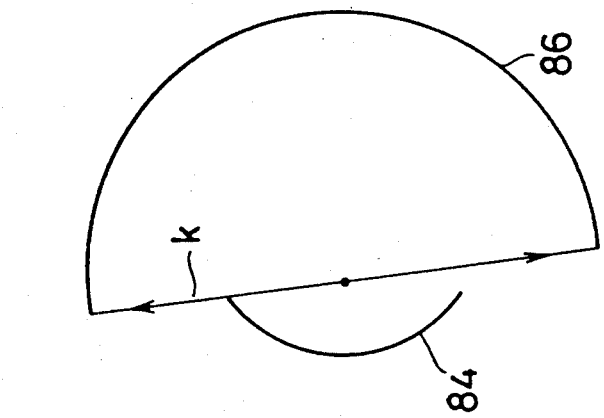
FIGS. 17A, 17B and 17C are drawings for the purpose of explaining the conditions that are requisite when establishing the configuration of spherical mirror of the the embodiment in FIG. 13.
Figure 17:
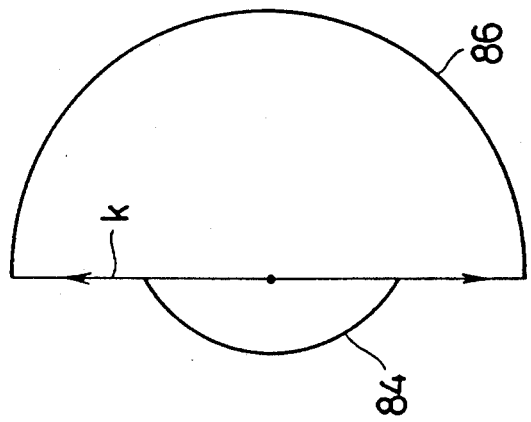
Figure 17:
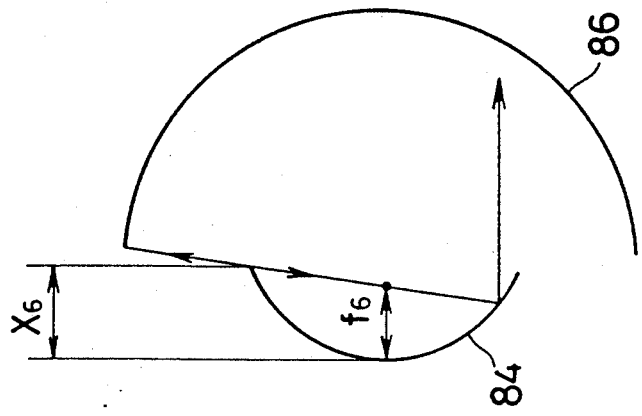

Following is a description of the method of establishing the dimensions of spherical mirror 86, based on FIGS. 16A and 16B.

In the Figures, a symbol $X_6$ designates the depth from a point 84b at the center of the top of parabolic mirror 84 to its vertex 84a, $X_7$ designates the depth from a point 84c center of either the right or left side of parabolic mirror 84 to its vertex 84a, $X_8$ designates the depth of spherical mirror 86, $Y_6$ designates the radius of the aperature portion of spherical mirror 86, r designates the radius of curvature of spherical mirror 86, and F designates the common point and $f_6$ designates the focal length of parabolic mirror 84. In this case the following equations are valid:

$$X_6 = V^2/16 f_6 \quad (19)$$

$$X_7 = H^2/16 f_6 \quad (20)$$

Since here H>V, we have $$X_6 < V_7 \quad (21)$$

Accordingly dimensions $X_8$ and $Y_6$ may be established in such a way that the light beams passing the deepest part of cutaway portion 88 of parabolic mirror 84 (near the reference numeral 84b) are reflected. Note, however, that in the event that focal length $f_6$ of parabolic mirror 84 is equal to or greater than depth $X_6$ of parabolic mirror 84 ($f_6 \geq X_6$, light beam k shown in FIGS. 17B and 17C will continue to reflect within spherical mirror 86 and will not be emitted. In order for this light not to be trapped, but emitted as shown in FIG. 17A, it is necessary that focal distance $f_6$ be less than V/4.

As a specific example, in a case using parabolic mirror 84 in which $f_6 = 12.5$ mm, $Y_5 = 46.5$ mm and $X_5 = 43.245$ mm, and where H=70 mm and V=55 mm, we would, with a spherical mirror, have r=55.745 mm. Further, values of or larger than $Y_6 = 55.493$ mm and $X_8 = 50.488$ mm, will also be satisfactory.

Figure 13:
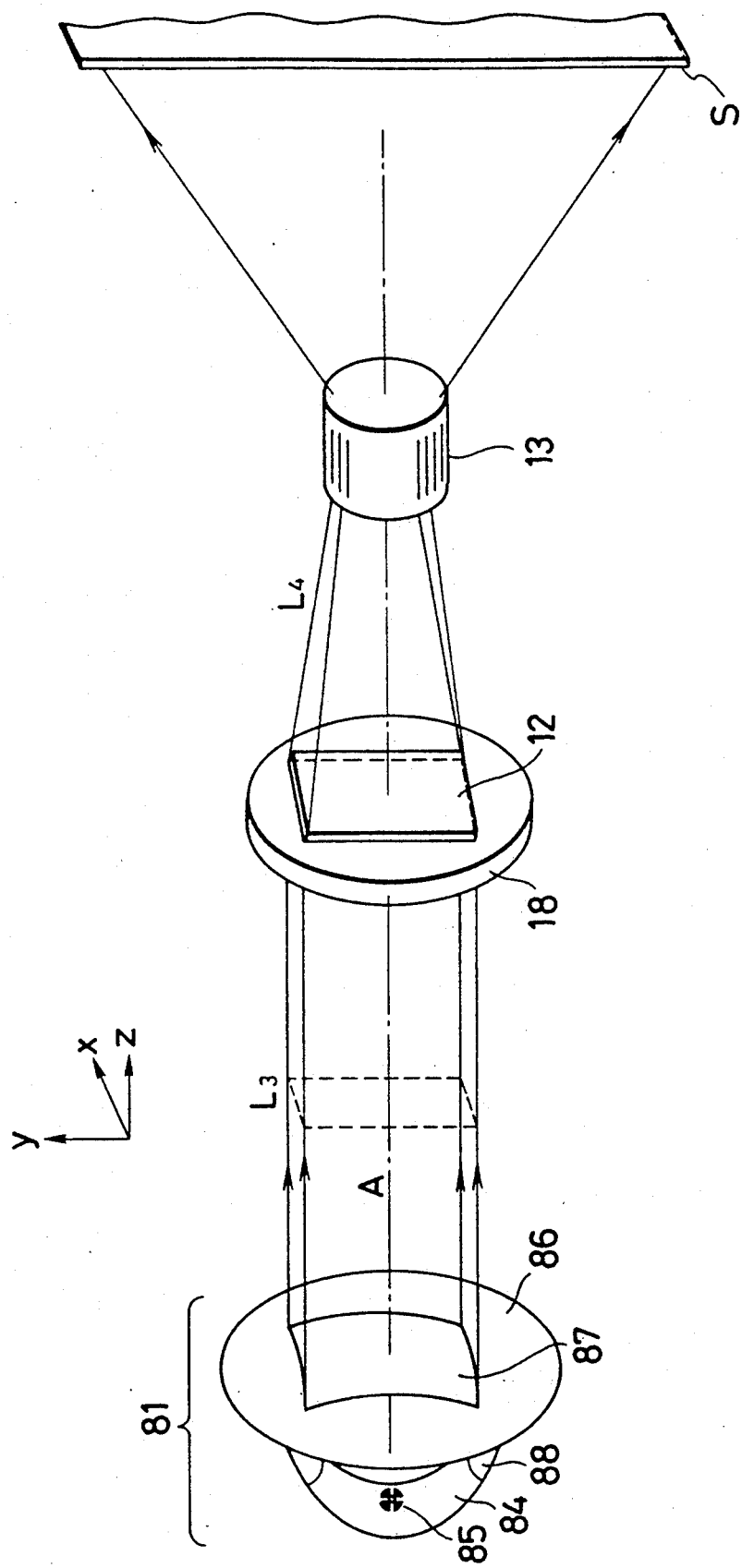
FIG. 13 shows the structure of another embodiment of the present invention.

In the embodiment shown in FIG. 13 and described above, light flux of rectangular cross section is emitted from aperture window 87 and impinges on the rectangular display area of liquid crystal light valve 12. Further, in the case shown in FIG. 13, a portion of the light subjected to forward scattering in FIG. 14 (light beams h and i in FIG. 14) can also be emitted as a parallel luminous flux, and the brightness of the projected image can be further increased.

Figure 19:
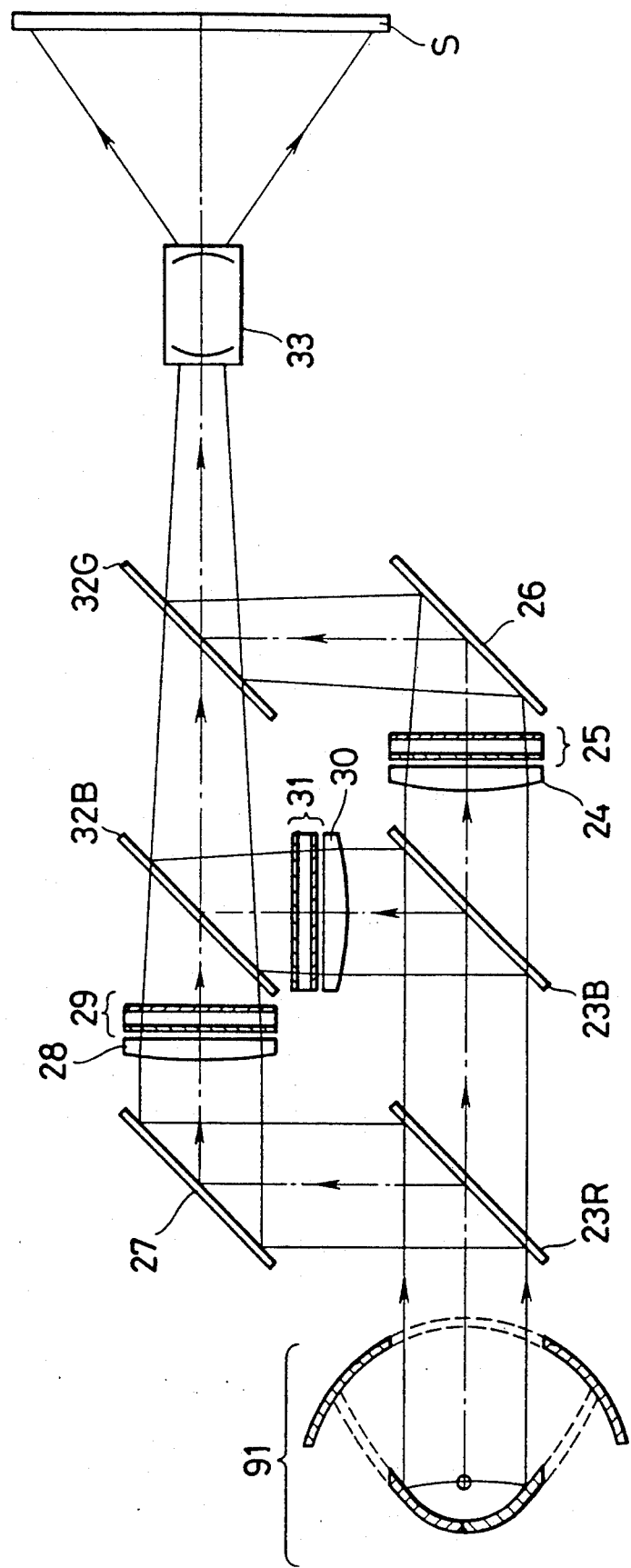
FIG. 19 shows a projection-type display device incorporating the same light source as in FIG. 13.

Following is a description of another embodiment of the present invention, based on FIG. 19.

The light source of this device has a structure that differs from that of the device shown in FIG. 6. Since the structure, except light source 91, is the same as that in FIG. 6, structural elements other than light source 61 are designated by the same reference numerals as in FIG. 6. Light source 91 is of the same structure as light source 81 in FIG. 13.

In this case, projection lens 33 magnifies a red, a blue and a green luminous flux, projecting a color image in screen S. And, as in the case shown in FIG. 8, luminous flux is not blocked wastefully, but increases the brightness of projected image.

Figure 20:
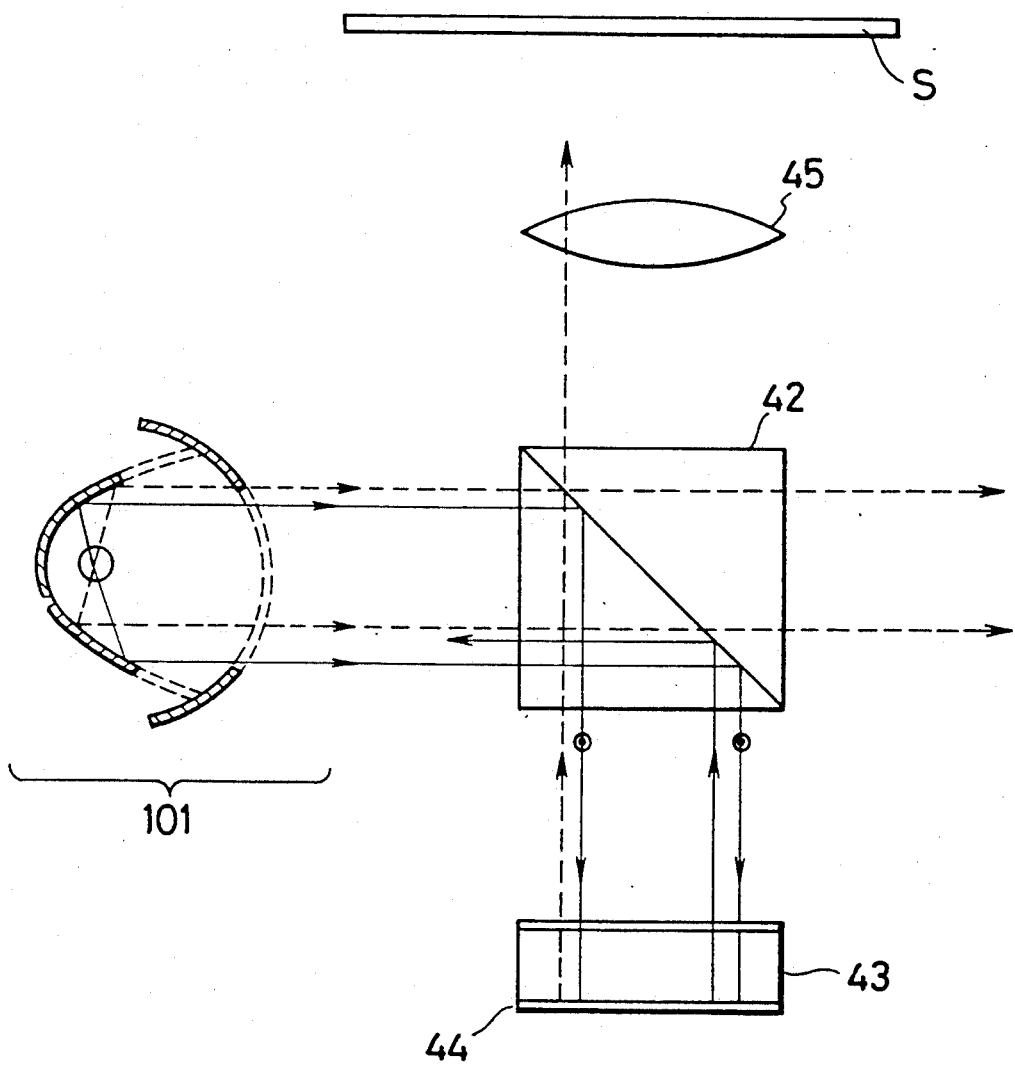
FIG. 20 shows a projection-type display device incorporating the same light source as in FIG. 13 and reflection-type liquid crystal light valve.

Following is a description of another embodiment using a reflection-type liquid crystal light valve 43 based on FIG. 20.

The light source of this device has a structure that differs from that of the device shown in FIG. 7. Since the structure, except light source 101, is the same as that in FIG. 7, structural elements other than light source 101 are designated by the same reference numerals as in FIG. 7. Light source 101 is of the same structure as light source 81 in FIG. 13.

In this case, as in the case shown in FIG. 14, a luminous flux of rectangular cross section is emitted from rectangular aperture window 87. And a portion of the light subjected to scattering in FIG. 14 (light beams h and i in FIG. 14) can be emitted as a parallel luminous flux. Thus the brightness of the display can be increased.

In all of the embodiments referred to above, the liquid crystal light valve not only of transmission type but also of reflection type can be applied. Also, the liquid crystal light valve using TN (twisted nematic) mode was explained. But other mode like ECB (electrically controlled birefringence) or scattering can also be adopted. And the number of light valve is not restricted to one or three, but two or greater than three can also be adopted.

What is claimed is:

1. A projection-type display device comprising:
   light source means for emitting a parallel luminous flux in a single direction;
   liquid crystal light valve means disposed in a path of the parallel luminous flux emitted from said light source means, having a rectangular display area, for outputting a rectangular two-dimensional image from the rectangular display area;
   a projection lens for magnifying the two-dimensional image output from said liquid crystal light valve means and projecting the magnified image on a screen;
   said light source means including,
   a first concave mirror, a reflecting surface of which is oriented in the direction of emission of the parallel luminous flux,
   a lamp placed in front of said first concave mirror, and
   a second concave mirror, a reflecting surface of which is oriented toward said lamp and the reflecting surface of said first concave mirror, said second concave mirror having an aperture window that is of a rectangular configuration substantially similar to the configuration of the rectangular display area of said liquid crystal light valve means, for emitting a rectangular two-dimensional luminous flux, which is parallel to an optical axis of said first and second concave mirrors, toward said liquid crystal light valve means thereby increasing an amount of the parallel luminous flux which impinges on said liquid crystal light valve means and increasing the magnified two-dimensional image brightness.

2. The projection-type display device of claim 1, in which said first concave mirror is a first parabolic mirror, and said second concave mirror is a second parabolic mirror.

3. The projection-type display device of claim 2, in which an optical axis of said first parabolic mirror and an optical axis of said second parabolic mirror are in alignment, and a focal point of said first parabolic mirror and a focal point of said second parabolic mirror are collocated.

4. The projection-type display device of claim 3, in which said lamp has a center of luminescence which is located at said focal point of said first parabolic mirror and said focal point of said second parabolic mirror.

5. The projection-type display device of claim 1, in which said first concave mirror is a parabolic mirror, and said second concave mirror is a spherical mirror.

6. The projection-type display device of claim 5, in which an optical axis of said parabolic mirror and an optical axis of said spherical mirror are in alignment, and a focal point of said parabolic mirror and a center of curvature of said spherical mirror are collocated.

7. The projection-type display device of claim 6, in which said lamp has a center of luminescence which is located at said focal point of said parabolic mirror and said center of curvature of said spherical mirror.

8. The projection-type display device of claim 5, in which said parabolic mirror, when viewed from a direction opposite said lamp, has a rectangular configuration substantially similar to said rectangular display area of said liquid crystal light valve means.

9. The protection-type display device of claim 8, in which an optical axis of said parabolic mirror and an optical axis of said spherical mirror are in alignment, and a focal point of said parabolic mirror and a center of curvature of said spherical mirror are collocated.

10. The projection-type display device of claim 9, in which said lamp has a center of luminescence which is located at said focal point of said parabolic mirror and said center of curvature of said spherical mirror.

11. The projection-type display device of claim 1, in which said aperture window of said concave mirror is a hole.

12. The projection-type display device of claim 1, in which said aperture window of said concave mirror is made of a transparent material.

13. The projection-type display device pf claim 1, in which said second concave mirror is made of a transparent material and a reflecting film disposed on said transparent material.

14. The projection-type display device of claim 12, further comprising;
    a non-reflective coating to visible light disposed on a surface of said transparent material of said aperture window.

15. The projection-type display device of claim 12, further comprising a coating reflecting ultraviolet rays and a coating reflecting infrared rays, both of them disposed on a surface of said transparent material of said aperture window.

16. The protection-type display device of claim 1, in which a peripheral edge of said first concave mirror and a peripheral edge of said second concave mirror are attached so as to form a sealed space between said first and second concave mirrors.

17. The projection-type display device of claim 4, wherein a depth of said first parabolic mirror is equal to a focal length of said second parabolic mirror and a depth of said second parabolic mirror is equal to a focal length of said first parabolic mirror.

18. The projection-type display device of claim 7, wherein a depth of said spherical mirror is double a focal length of said parabolic mirror.

19. The projection-type display device of claim 10, wherein a radius of curvature of said spherical mirror is equal to a depth of said parabolic mirror plus a focal length of said parabolic mirror and the focal length of said parabolic mirror is less than a shorter side length of said rectangular aperture window divided by four.

20. A projection-type display device comprising:
    light source means for emitting a parallel luminous flux in a predetermined direction;
    dichroic mirror means for separating the parallel luminous flux into red, blue and green luminous fluxes;
    liquid crystal light valve means disposed in a path of the red, blue, and green luminous fluxes having a rectangular display area, for outputting a red, blue, and green rectangular two-dimensional image from rectangular display areas;

a projection lens for magnifying the red, blue and green two-dimensional images from said liquid crystal light valve means and projecting the magnified image on a screen;

said light source means including, a first concave mirror, a reflecting surface of which is oriented in the direction of emission of the parallel luminous flux, a lamp placed in front of said first concave mirror, and a second concave mirror, a reflecting surface of which is oriented toward said lamp and the reflecting surface of said first concave mirror, said second concave mirror having an aperture window substantially equivalent in size to the rectangular display areas of said liquid crystal light valve means, for allowing a rectangular two-dimensional beam of the parallel luminous flux, which is parallel to an optical axis of said first and second concave mirrors, to impinge on said dichroic mirror means and said liquid crystal light value means in order to increase an amount of the parallel luminous flux which impinges on said liquid crystal light valve means, thereby increasing the projected image brightness.

21. The projection-type display device of claim 20, in which said first concave mirror is a first parabolic mirror, and said second concave mirror is a second parabolic mirror.

22. The projection-type display device of claim 21, in which an optical axis of said first parabolic mirror and an optical axis of said second parabolic mirror are in alignment, and a focal point of said first parabolic mirror and a focal point of said second parabolic mirror are collocated.

23. The projection-type display device of claim 22, in which said lamp has a center of luminescence which is located at said focal point of said first parabolic mirror and said focal point of said second parabolic mirror.

24. The projection-type display device of claim 20, in which said first concave mirror is a parabolic mirror and said second concave mirror is a spherical mirror.

25. The projection-type display device of claim 24, in which an optical axis of said parabolic mirror and an optical axis of said spherical mirror are in alignment, and a focal point of said parabolic mirror and a center of curvature of said spherical mirror are collocated.

26. The projection-type display device of claim 25, in which said lamp has a center of luminescence which is located at said focal point of said parabolic mirror and said center of curvature of said spherical mirror.

27. The projection-type display device of claim 24, in which said parabolic mirror, when viewed from a direction opposite said lamp, has a rectangular configuration substantially similar to said rectangular display areas of said liquid crystal light valve means.

28. The projection-type display device of claim 27, in which an optical axis of said parabolic mirror and optical axis of said spherical mirror are in alignment, and a focal point of said parabolic mirror and a center of curvature of said spherical mirror are collocated.

29. The projection-type display device of claim 28, in which said lamp has a center of luminescence which is located at said focal point of said parabolic mirror and said center of curvature of said spherical mirror.

30. The projection-type display device of claim 20, in which said aperture window of said concave mirror is a hole.

31. The projection-type display device of claim 20, in which said aperture window of said concave mirror is made of a transparent material.

32. The projection-type display device of claim 20, in which said second concave mirror is made of a transparent material and a reflecting film disposed on said transparent material.

33. The projection-type display device of claim 31, further comprising:

a non-reflective coating to visible light disposed on a surface of said transparent material of said aperture window.

34. The projection-type display device of claim 31, further comprising a coating reflecting ultraviolet rays and a coating reflecting infrared rays, both of them disposed on a surface of said transparent material of said aperture window.

35. The projection-type display device of claim 20, in which a peripheral edge of said first concave mirror and a peripheral edge of said second concave mirror are attached so as to form a sealed space between said first and second concave mirrors.

36. The projection-type display device of claim 23, wherein a depth of said first parabolic mirror is equal to a focal length of said second parabolic mirror and a depth of said parabolic mirror equal to a focal length of said first parabolic mirror.

37. The projection-type display device of claim 26, wherein a depth of said spherical mirror is double a focal length of said parabolic mirror.

38. The projection-type display device of claim 29, wherein a radius of curvature of said spherical mirror is equal to a depth of said parabolic mirror plus a focal length of said parabolic mirror and the focal length of said parabolic mirror is less than a shorter side length of said rectangular aperture window divided by four.

39. A projection-type display device, comprising:

light source means for emitting a parallel luminious flux in a predetermined direction;

polarized beam splitter means for separating the parallel luminous flux into first P-polarized light and S-polarized light by reflecting only the S-polarized light;

liquid crystal light valve means disposed in a path of the S-polarized light, having a rectangular display area, a glass substrate and a plurality of pixels formed in a matrix, for converting the S-polarized light into second P-polarized light when a voltage in excess of a threshold is not applied and for transmitting the second P-polarized light through said polarized beam splitter means; and projection means for projecting the second P-polarized light, which has been transmitted through said polarized beam splitter on a screen;

said light source means including, a first concave mirror, a reflecting surface of which is oriented in the direction of emission of the parallel luminous flux, a lamp placed in front of said concave mirror, and a second concave mirror, a reflecting surface of which is oriented toward said lamp and the reflecting surface of said first concave mirror, said second concave mirror having an aperture window substantially equivalent in size to the rectangular display area of said liquid crystal light valve means, for allowing a rectangular two-dimensional beam of the parallel luminous flux, which is parallel to an optical axis of said first and second concave mirrors, to impinge on said liquid crystal light valve means in order to increase an amount of the parallel luminous flux which impinges on said liquid crystal light valve means, thereby increasing the projected image brightness.

40. The projection-type display device of claim 39, in which said first concave mirror is a first parabolic mirror, and said second concave mirror is a second parabolic mirror.

41. The projection-type display device of claim 40, in which an optical axis of said first parabolic mirror and an optical axis of said second parabolic mirror are in alignment, and a focal point of said first parabolic mirror and a focal point of said second parabolic mirror are collocated.

42. The projection-type display device of claim 41, in which said lamp has a center of luminescence which is located at said focal point of said first parabolic mirror and said focal point of said second parabolic mirror.

43. The projection-type display device of claim 39, in which said first concave mirror is a parabolic mirror, and said second concave mirror is a spherical mirror.

44. The projection-type display device of claim 43, in which an optical axis of said parabolic mirror and an optical axis of said spherical mirror are in alignment, and a focal point of said parabolic mirror and a center of curvature of said spherical mirror are collocated.

45. The projection-type display device of claim 44, in which said lamp has a center of luminescence which is located at said focal point of said parabolic mirror and said center of curvature of said spherical mirror.

46. The projection-type display device of claim 43, in which said parabolic mirror, when viewed from a direction opposite said lamp, has a rectangular configuration substantially similar to said rectangular display area of said liquid crystal light valve means.

47. The projection-type display device of claim 46, in which an optical axis of said parabolic mirror and an optical axis of said spherical mirror are in alignment, and a focal point of said parabolic mirror and a center of curvature of said spherical mirror are collocated.

48. The projection-type device of claim 47, in which said lamp has a center of luminescence which is located at said focal point of said parabolic mirror and said center of curvature of said spherical mirror.

49. The projection-type display device of claim 39, in which said aperture window of said concave mirror is a hole.

50. The projection-type display device of claim 39, in which said aperture window of said concave mirror is made of a transparent material.

51. The projection-type display device of claim 39, in which said second concave mirror is made of a transparent material and a reflecting film disposed on said transparent material.

52. The projection-type display device of claim 50, further comprising:
a non-reflective coating to visible light disposed on a surface of said transparent material of said aperture window.

53. The projection-type display device of claim 50, further comprising a coating reflecting ultraviolet rays and a coating reflecting infrared rays, both of them disposed on a surface of said transparent material of said aperture window.

54. The projection-type display device of claim 39, in which a peripheral edge of said first concave mirror and a peripheral edge of said second concave mirror are attached so as to form a sealed space between said first and second concave mirrors.

55. The protection-type display device of claim 42, wherein a depth of said first parabolic mirror is equal to a focal length of said second parabolic mirror and a depth of said second parabolic mirror is equal to a focal length of said first parabolic mirror.

56. The projection-type display device of claim 45, wherein a depth of said spherical mirror is double a focal length of said parabolic mirror.

57. The projection-type display device of claim 45, wherein a radius of curvature of said spherical mirror is equal to a depth of said parabolic mirror plus a focal length of said parabolic mirror and the focal length of said parabolic mirror is less than a shorter side length of said rectangular aperture window divided by four.

* * * * *